United States Patent [19]

Reese et al.

[11] 3,887,507

[45] June 3, 1975

[54] PROCESS FOR PREPARING TRIKETOIMIDAZOLIDINES AND PRODUCT

[75] Inventors: Johannes Reese, Wiesbaden-Biebrich; Kurt Kraft, Auringen, both of Germany

[73] Assignee: Reichhold-Albert-Chemie- Aktiengesellschaft, Hamburg, Germany

[22] Filed: Jan. 18, 1972

[21] Appl. No.: 218,691

Related U.S. Application Data

[63] Continuation-in-part of Ser. No. 154,634, June 18, 1971.

[30] Foreign Application Priority Data

Aug. 4, 1971  Germany............................ 2139005

[52] U.S. Cl......... 260/37 N; 117/123 D; 117/128.4; 117/132 B; 161/205; 161/219; 260/30.2; 260/30.6 R; 260/30.8 DS; 260/32.4; 260/32.6 N; 260/32.8 N; 260/33.4 P; 260/47 CB; 260/77.5 R; 260/309.7
[51] Int. Cl...................... C08g 33/02; C08g 33/10
[58] Field of Search........ 260/77.5 R, 47 CB, 309.7, 260/37 N

[56] References Cited
UNITED STATES PATENTS 3,510,454   5/1970   Bottenbruch et al................. 260/47
3,541,048   11/1970  Binsack et al....................... 260/47

*Primary Examiner*—Lester L. Lee
*Attorney, Agent, or Firm*—Littlepage, Quaintance, Murphy & Dobyns

[57] ABSTRACT

A process for the manufacture of modified N,N'-substituted 2,4,5-triketoimidazolidines which comprises reacting (a) at least one oxamidic ester having the group $-NH-CO-CO-OR^v$ wherein $R^v$ is an aliphatic hydrocarbon group having up to 18 carbon atoms, a cycloaliphatic hydrocarbon group with up to 8 carbon atoms, a mononuclear aromatic hydrocarbon group having up to 14 carbon atoms, a mononuclear aromatic hydrocarbon group being substituted by one or more hydrocarbon groups having a total of up to 14 carbon atoms, (b) at least one ioscyanate or isocyanate forming compound and (D) at least one compound selected from the group consisting of (d) an azomethine of formula (37) (cf. formula sheet), (e) a metal chelate of component (d), (f) an azo compound of formula (38), (g) a metal chelate component (f), (h) a combination of at least two of compounds (d) to (g) and, if desired, (c) a polycarboxylic acid, and a film, coating or shaped article prepared from said reaction product.

17 Claims, No Drawings

PROCESS FOR PREPARING TRIKETOIMIDAZOLIDINES AND PRODUCT

The instant application is a continuation-in-part of application Ser. No. 154,634, filed June 18, 1971.

This invention relates to a process for the preparation of modified N,N'-substituted 2,4,5-triketoimidazolidines.

N,N'-substituted 2,4,5-triketoimidazolidines may be prepared by reacting an alkyl ester of oxamidic acid with an isocyanate. The reaction proceeds according to equation (1) of the accompanying drawings, the second molecule of isocyanate serving as condensation agent in the formation of the imidazoline ring. This reaction is particularly useful in the preparation of precondensates containing terminal groups which can react with one another e.g. according to equation (2) of the drawings.

The terminal groups —NH—CO—COOR$^V$ and —NH—COOR$^{IV}$ can react together according to equation (2a) with the elimination of two molecules of alcohol so as to form poly-2,4,5-triketoimidazolidine under the influence of heat. It has already been proposed that this type of reaction is of more general application.

In equations (1), (2) and (2a):

R is a carbocyclic or heterocyclic aromatic group, R$^{III}$ is a carbocyclic or heterocyclic aromatic group or an aliphatic or cycloaliphatic hydrocarbon group and R$^{IV}$ and R$^{V}$ which may be the same or different, are each organic groups.

In our copending Application No. 154,634 filed June 18, 1971 we have described and claimed a process for the manufacture of modified N,N'-substituted 2,4,5-triketoimidazolidines which comprises reacting (a) one or more oxamidic esters having the group —NH—CO—CO—OR$^r$, wherein R$^r$ is an aliphatic hydrocarbon group having up to 18 carbon atoms, a cycloaliphatic hydrocarbon group with up to 8 carbon atoms, a mononuclear aromatic hydrocarbon group which may be substituted by one or more hydrocarbon groups having a total of up to 14 carbon atoms (b) one or more isocyanates or isocyanate forming compounds and (c) a polybasic carboxylic acid component having 4 to 70 carbon atoms and up to 6 carboxylic groups so as to obtain a conndensation product possessing amide or imide groups.

This reaction is shown in the equations (3) to (5). In these equations the symbols have the following significance:

R is a mono or polynuclear, mono to hexavalent (in equations (2) and (2a) however shown only as a divalent radical), carbocyclic or heterocyclic aromatic group with up to 20 carbon atoms which may be substituted by halogen, nitro, dialkylamino, diarylamino, alkylarylamino, alkyl, alkoxy, carboxyalkyl, carboxyaryl, acyl e.g. acetyl, cycloalkyl or halogenated alkyl, alkoxy, carboxyalkyl, carboxyaryl, acyl e.g. acetyl, or cycloalkyl groups. Any substituent group may have up to 18 carbon atoms. The aromatic group may also be a quinone and when R is a polyvalent aromatic group it may be linked to an aliphatic group by at least one hetero atom.

R''' has the meaning given above for R and in addition may be an aliphatic hydrocarbon group with up to 18 carbon atoms or a cycloaliphatic hydrocarbon group with up to 12 carbon atoms;

R$^{IV}$ and R$^{V}$ which may be the same or different, may each be an aliphatic hydrocarbon group with up to 18, preferably up to 6, carbon atoms, a cycloaliphatic hydrocarbon group with up to 18 carbon atoms, a mononuclear aromatic hydrocarbon group with 6 carbon atoms which may be substituted by an aliphatic hydrocarbon group with up to 14 carbon atoms;

R$_{tr}$ is a trivalent aliphatic, carbo- or heterocyclic, mono or polynuclear group, for example a cycloaliphatic, aliphatic-aromatic or aromatic hydrocarbon group with 2 to 20 carbon atoms which may be substituted by alkyl, halogen or amino.

We have now found a modification of the process described in our aforesaid Application No. 154,634 filed June 18, 1971 that enables us to obtain valuable polymeric 2,4,5-triketoimidazolidine compounds.

In our modification we use an additional component in the process. Our additional component is an azomethineor azobenzene dicarboxylic acid or a mixture thereof or a metal chelate thereof respectively and this component may be used together with or in place of the polybasic carboxylic acid component (c). The carboxyl groups of the dicarboxylic acid occupy the 3- and 5- positions of the benzene ring.

Accordingly the invention provides a process for the manufacture of modified N,N'-substituted 2,4,5-triketoimidazolidines which comprises reacting (a) one or more oxamidic esters having the group —NH—CO—CO—OR$^r$ wherein R$^r$ is an aliphatic hydrocarbon group having up to 18 carbon atoms, a cycloaliphatic hydrocarbon group with up to 8 carbon atoms, a mononuclear aromatic hydrocarbon group which may be substituted by one or more hydrocarbon groups having a total of up to 14 carbon atoms, (b) one or more isocyanates or isocyanate forming compounds and (d) an azomethine of formula (37) (cf. formula sheet) or (e) a metal chelate thereof (f) an azo compound of formula (38) or (g) a metal chelate thereof or (h) a combination of at least two of compounds (d) to (g), wherein R$^{VI}$ is an aromatic group having at least one aromatic nucleus and having from 6 to 14, preferably up to 10, carbon atoms and containing a hydroxy group ortho to the azomethine group, a substituted product thereof having from 6 to 22 carbon atoms and having at least one substituent selected from the group consisting of alkyl, cycloalkyl, benzyl, hydroxy, methoxy, aryl, aryloxy, carboxyl, acyl, nitro, and halogen, each substituent containing up to 6 carbon atoms.

R$^{VII}$ is at least a monovalent group, such as an aromatic group, having 6 to 14 carbon atoms and containing a hydroxy group ortho to the azo group, a substituted product thereof having up to 22 carbon atoms and having at least on substituent selected from the group consisting of alkyl, cyclohexyl, alkoxy, acyl, carboxyalkyl, a fluorcarbon group or halogen, such as chlorine, each substituent containing up to 6 carbon atoms.

R$^{VII}$ including all substituents may contain up to 22 carbon atoms, so as to obtain a reaction product containing chelate forming groups which is subsequently isolated or reacted with a chelate forming metal compound.

The process according to the invention may be carried out in the presence of a catalyst and a preferred temperature range for the process is from −20° to +280°C.

The products obtained by the process according to the invention can be used as such as additives or plastics because of their thermal stabiity. The excellent shelf life is probably due to the chelate forming groups which trap any metal residues that may be present and that would cause degradation of the resin. If desired the product may be reacted with a chelate forming metal compound. The chelating groups present in the reaction product from the first stage can then react with chelate formation. It is thus advantageous to choose mono or polyvalent compounds of metals that form chelates or complexes.

Chelate formation may be effected at any desired time for example prior, during or after the synthesis of the polymer chain since all that is required is the addition of the metal compound.

The addition of the azo or azomethine compound or the chelate thereof can be effected at any desired time during the reaction, for example as a solution in a suitable solvent, with the other components and the isocyanates. The reaction sequence is explained in simplified form in equation (6) but see also equations (7a) and (7b) and (11). The symbols in the equation have the following meaning:

A′ = the number of moles oxamide acid esters (40)
B′ = the number of moles isocyanate (42)
C′ = the number of moles polycarboxylic acid (39)
D′ = the number of moles azo or azomethine compound (41)

The chelate forming compounds will normally be incorporated into the polymer chain via the carboxyl groups of the polycarboxylic or amidocarboxylic acid compound by reaction with the isocyanate groups of the reaction component with the formation of amido groups. The free isocyanate may also react with the carboxyl group. The o-hydroxy group may initially react with the isocyanate forming a phenolic carbamic acid ester, however these may be split again during the course of the polycondensation, especially at the higher reaction temperature.

If, for example, the chelate forming component is incorporated in the polymer chain and this polymer is subsequently reacted, for example with a divalent metal compound, a cross-linked polymer will be obtained as can be seen from equation (7) (see formula sheet).

The cross-linking mechanism may be confirmed if for example a cobalt-(II), copper-(II) and iron-(II)-salt is added to a polymer solution to which such a chelate forming agent is added and the mixture heated to 150° to 200°C. Gelation occurs after a short time. After removal of the solvent, this gel yields a completely insoluble and unmeltable polymer.

For the reaction of oxamide acid ester, the polycarboxylic acids, isocyanates and azo- or azomethine compounds equation (8) (see formula sheet) applies if A′ to D′ all have the same functionality.

(8) $(A' + C' + D') = \alpha \cdot B'$ wherein $\alpha$ is from 0.95 to 1.07, preferably 0.98 to 1.02.

The isocyanate component can thus be used in a small excess or in slightly less than an equivalent amount, calculated on the three other components. The differing functionalities of the components must be taken into account accordingly. If there is a different number of functional groups, the reciprocal molar proportions change in the usual way.

The ratio of oxamide acid ester to the chelate forming azo- or azomethine compounds or their chelate is normally (2 to 94), preferably (1 to 80): (0.1 to 50), preferably (5 to 20) mol percent. If polycarboxylic acids (c) are employed as reaction components, the amount used may be from 5 to 95, preferably 10 to 80 mol percent, calculated on the other reaction component, especially the oxamide acid ester, the total amount of these two substances being 100 mol percent in both cases.

The chelate forming metal compound may be used in an amount that is approximately equimolar to the chelate forming groups.

In equation (5) chain-formation can be seen to be effected by reaction of the anhydride groups of compound V with the isocyanate II with the formation of an imide. The free isocyanate group can then react further, in accordance with equation (4) with oxamide acid ester with the formation of triketoimidazolidine rings. The free ester group of compound V may react with further isocyanate, for example with compound II, III or VI with chain extension and formation of further triketoimidazolidine rings. The reactions in accordance with equation (3) to (5) take place with the elimination of alcohol or carbon dioxide. They are condensations and are not confined to the tricarboxylic acids normally used. Di- and other polycarboxylic acids may be reacted in analogous manner. The generation of carbon dioxide or alcohol can also be utilised for the production of foamed products although the usual propellents, such as paraffin hydrocarbons with 5 to 9 carbon atoms, may also be used. It is also possible to react first of all the oxamide acid ester with the isocyanate, for example with the formation of compounds of formula IX in which Q and Q′ are NH—CO—OR$^{II}$ or —NH—CO—COOR$^V$ and R and R′′′, R$^{IV}$ and R$^V$ have the above meanings. Compound IX may then be reacted with the polycarboxyic acid in the second stage.

In the products obtained according to the invention, the same terminal groups as appear in compounds I or IV may be present. It is also possible that oxamidic ester groups are located at either or both ends of the molecule, or that urethane or isocyanate groups are located at either or both ends of the molecule. In the preparation of branched products, the terminal groups may vary even more.

Depending on the reaction conditions, mono or polymer compounds may be obtained by the process according to the invention.

The precondensates obtained according to equation (2a), which contain triketoimidazolidine rings, generally have a comparatively low molecular weight. Although these compounds have generally proved satisfactory, it has been desirable for many applications to use modified compounds having a higher molecular weight so as to extend their applications and to improve their manipulation.

In the reaction in accordance with the invention, branched monomers or polymers may also be obtained if for example one starts with at least trivalent isocyanates, at least trivalent carboxylic acids or at least trivalent oxamide acid esters or a mixture of these polyvalent components, possibly in admixture with mono or divalent components. If the branching is to take place on the tricarboxylic acid centre, then for example the free acid should be reacted with three moles of isocyanate in a manner analogous to equation (3) so that amide cross-linking occurs in three directions. The three isocyanate groups are then reacted for example with 2 mole or equimolar amounts of oxamide acid ester with the formation of two or three triketoimidazolidine groups.

Monomers can be prepared containing three or more triketoimidazolidine groups. This may be the case if one starts from monooxamide acid esters and triisocyanates. In the preparation of these compounds the amino groups should not be arranged in the o-position in the cyclic radical R of the oxamide acid ester or $R_{poly}$ of the polycarboxylic acids in order to avoid undesirable side reactions. Further products of this invention include compounds of formulae (XXIX) and (XXX) (see the drawing). It is also possible to prepare polymers. In formulae (XXIX) and (XXX)

R has the above meaning;

R' has the meaning stated above under R''';

R'' has the meaning given under R, when R and R'' may be the same or different;

R'''has the above meaning when R' and R''' may be the same or different and R''' is no more than quadrivalent, $R_{poly}$ is a di- to hexa-valent, preferably a di- or trivalent aliphatic, carbocyclic or heterocyclic, mono or polynuclear group, for example cycloaliphatic, aliphatic-aromatic or aromatic hydrocarbon with 2 to 20 carbon atoms, if desired substituted by alkyl, halogen or amino. The aliphatic group may be saturated or singly or plurally, for example doubly, olefinically unsaturated;

$x$ is zero when $y = 1$, or 1;

$y$ is zero or an integer of 1 to 70;

$z$ an integer from 1 to 6, preferably 1 to 3 and at least two, Q = zero;

$i$ and $k$ may be the same or different and are —NH—CO or

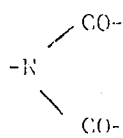

$g$ and $h$ are 1 or 2 and ($g + h$) is not more than 3;

$d, e, f$ and $j$ are 0 or 1 and ($d + e + f + j$) is at least 1 and where one of the groups R and R''' is aromatic and, if R''' is aliphatic or cycloaliphatic, the group R, R' or R'' adjacent to R''' must be aromatic.

The group $R_{poly}$ in formulae (XXIX) and (XXX) may be replaced, at least partially, by groups of the azo- or azomethine compounds (37) and (38).

As will be seen from formula (XXIX) and the appropriate definition, $R_{poly}$ is shown as being di or trivalent. It is quite possible to use a tetravalent, pentavalent or hexavalent carboxylic acid in which case $R_{poly}$ is tetra- penta or hexavalent, $g$ and $h$ are each an integer of from 1 to 5 and ($g+h$) is no more than 6. Branching can then occur with $R_{poly}$ as can be seen for example from formula (XXXI). The group $R_{poly}$ in the compounds (XXIX) and (XXX) may also be replaced, at least partially, by imide groups in accordance with compound VI.

Alternatively the branching point may be the group R'. In the compounds of formula (XXIX), R, R', R'' and R''' may be branched because of their polyfunctionality. A product in which branching occurs at R' is shown in formula (XXX) (the square brackets have the same significance as in formula (XXIX)).

The process in accordance with the invention can be carried out over a wide temperature range. For example, the reaction can take place in the absence, or preferably in the presence of solvents at temperatures of from −20° to 280°C, preferably 0° to 180°C. The reaction is exothermic and in many cases takes place at ambient temperature or slightly elevated temperatures, for example 40° to 50°C. To complete the reaction, and when using certain less reactive isocyanates of polycarboxylic acids or their anhydrides, heating may be advisable. It is also possible, to react the starting products in the melt and possibly thereafter in, preferably phenolic, solvents.

Ideally, the reaction is carried out in suitable solvents, possibly in a discrete one pot reaction. The reaction of azomethine or azo- compounds may take place prior to, during or after the reaction of the oxamide acid ester with the isocyanates. It is not necessary to use mixtures of the reaction components and it is possible to carry out the reaction in such a manner that firstly one component is introduced, possibly mixed with a small portion of the second, third and possibly other components, and thereafter the major portion of the second, third and possibly other partners of the reaction is added. This technique can be carried out both in solution and in melt. A catalyst may be added to the first reaction component and/or to that used later on. It is also possible to react initially only two components with one another and to react additional components in one or more further stages. For example, the polycarboxylic acids may be partially reacted with the isocyanates with the formation of imides or amides and, as a second stage, reaction may be effected with the oxamide acid ester and possibly in a further stage the reaction with the remaining polycarboxylic acid and the compounds (37) and (38) may take place. Reaction in two stages is shown by equations (3) and (4), the incorporation of compounds (37) and (38) is not shown. Since the product still contains reactive groups at both ends of the molecule these may react with further isocyanate groups and possibly further oxamide acid ester groups with chain extension, for example with the formation of amide or imide according to equation (5) and possibly with branching.

In general the oxamide acid ester, azo- or azomethine compound and possibly a polycarboxylic acid are dissolved or finely dispersed in a solvent. Thereafter, the isocyanate, in solid, liquid, or dissolved form is added at temperatures of from −20° to 380°C, preferably from 0° to 250°C and more preferably from 50° to 200°C. Subsequently, condensation is carried out at temperatures of from 100° to 250°C until no more alcohol and no $CO_2$ are given off from the reaction mixture. It is however also possible to take the condensation only to the point where the equimolecular amount of alcohol or $CO_2$ has not yet been split off. This results in less high molecular, for example monomeric or oligomeric products whose further condensation to high molecular product may possibly take place only during later processing or immediately after preparation.

Suitable oxamide acid esters of formula (VII) in which R and R' have the above meaning and R is an integer of 1 to 6, include bisoxamide acid esters of formula (50) wherein A' indicates a possibly substituted divalent cyclic preferably aromatic radical with up to 12 carbon atoms in the ring system, one nucleus possibly being substituted up to four times.

The group R or A' in the oxamide acid esters is a carbocyclic or heterocyclic aromatic group and may, for example, be phenyl, naphthyl, benzeneazophenyl or benzothiazolylphenyl.

R'' and R' in the oxamide acid may be alkyl with up to 6 carbon atoms, preferably $-CH_3$, $-C_2H_5$, $-C_4H_9$; phenyl; or phenyl substituted with alkyl, preferably of up to 6 carbon atoms.

Suitable groups A' are those of the formulae (47) to (49) in which $X = -CH_2-$, $-O-$, $-S-$, $-S-S-$, $-SO_2-$, $-N=N-$, $-NR^{VIII}$, ($R^{VIII}$ being aliphatic, cycloaliphatic or aromatic with up to 8 carbon atoms), diphenylene, dimethyldiphenylene, anthraquinonylene, pyridylene, quinonylene, thiophenylene, benzofurylene and N-methylcarbazolylene radicals, which may be substituted in one or more aromatic and/or heterocyclic nuclei, singly or plurally, for example by alkyl, alkoxy, halogenoalkyl, ester, alkylketone, (ω-m)-ketoalkyl, alkylsulfonyl with 5 carbon atoms each, phenyl, when m is 1, 2 or 3 such as $-CH_3$, $-C_2H_5$, $-OCH_3$, $-OC_2H_5$, $-SO_2CH_3$, $-CN$, $-COCH_3$, $-SO_2CH_3$, $-CF_3$, $-COOC_2H_5$, moreover nitro, cyano group, halogen, especially fluorine, chlorine or bromine. Other suitable bisoxamide acid esters of formula (VII) are tris and/or tetrakis-oxamide acid esters which may be used alone or in admixture with the bisoxamide acid esters. Suitable oxamide acid esters are those with the radical of formula (48) are for example shown in formula (XXXII). In formulae (VII) and (XXXIIA)

R is a mono or polynuclear, mono to hexavalent carbocyclic or heterocyclic aromatic group with up to 20 carbon atoms, shown in equations (2) and (3) however only as being divalent which may be substituted by halogen; nitro; dialkylamino; diarylamino; alkylarylamino; alkyl; alkoxy; carboxyalkyl; carboxyaryl; acyl for example acetyl; cycloalkyl; or halogenated alkyl, alkoxy, carboxyalkyl, carboxyaryl, acyl, for example acetyl, or cycloalkyl; all of which may have up to 18 carbon atoms. The aromatic group may also be a quinone and, when R is a polyvalent aromatic group it may be linked to an aliphatic group by at least one hetero atom. The oxamide acid esters may have 1 to 6 ester groups therefore.

In the formula (44) for the polycarboxylic acids, $R_{poly}$ is a di- to hexavalent, preferably trivalent, aliphatic, carbocyclic or heterocyclic, mono or polynuclear for example cycloaliphatic, aliphatic-aromatic or aromatic hydrocarbon with up to 20 carbon atoms, if desired substituted by alkyl, halogen or amino, in which the aliphatic group is saturated, or singly or plurally, for example doubly, olefinically unsaturated and in which p is an integer of from 2 to 6.

The polycarboxylic acids may be up to hexavalent and in general have from 4 to 70 carbon atoms and may be substituted by chlorine, bromine and/or alkyl groups of up to 6 carbon atoms. The polycarboxylic acids may be used as such or as anhydrides if desired together with amides or in the form of polycarboxylic acids containing imide or amide groups, condensation products with amide and/or imide groups being obtained in the last two named cases.

The polycarboxylic acid (39) in accordance with equation 6 can be prepared prior to the polycondensation in the reaction vessel from the components, that is in a one pot stage reaction, in the case of component (39) for example from 4,4-diamine-diphenylsulfonate or the corresponding compound from 4,4-diaminodiphenylmethane and 2 moles trimellitic anhydride in a solvent suitable for the polycondensation. As stated above, the polycondensation itself may be carried out subsequently.

The process according to the invention therefore makes possible the preparation of monomeric to high molecular condensation products which are additionally chelate of chelate forming groups and which are simultaneously 2,4,5-triketoimidazolidines and polyamides, -imides or polyamidoimides. Compounds having a combination of both the latter groups possess particularly good processing properties.

Suitable polycarboxylic acids and anhydrides include isophthalic, bromoisophthalic, 3-aminoisophthalic, trimellitic, pyromellitic, terephthalic, 2,5-dianilinoterephthalic, 2,5-ditoluidino-terephthalic, 4-aminonaphthalic, 4,4-methylenebisanthranilic, hemimellitic, mellitic, maleic, fumaric, itaconic, muconic, hexahydroterephthalic, adipic, glutaric, tartaric, sebacic, suberic, tetrahydrofurantetracarboxylic acid, benzophenonetetracarboxylic acid, 1,4,5,8-naphthalenetetracarboxylic acid, perylenetetracarboxylic acid, benzophenonehexacarboxylic acid dilactone, and condensed systems that contain at least 2 carboxyl groups in the molecule such as N,N'-terephthaloyl-bisglycine, N,N'-isophthaloyl-bis-glycine or bis-carboxymethylamino-diphenylmethane (or diphenyl ether, or diphenylsulfone). Polycarboxylic acids of formulae XXIV to XXVIIIa, XXXIV to XXXV and XXVII to XXXIX may also be suitable for the reaction. Compound XXXIV may be a di-, tri- or tetracarboxylic acid and in conjunction with XXXV the anthraquinonylene group may be substituted in the 1,5- or 1,8-positions. Other suitable acids are polycarboxylic acids containing an amino group for example the products obtained by reacting meleic anhydride with diaminodiphenylmethane, diaminodiphenyl ether, p-phenylenediamine or m-phenylenediamine with amide formation and liberation of a carboxyl group of maleic anhydride.

The process is equally suitable for the preparation of symmetric as well as unsymmetric triketoimidazolidines. Such a reaction is possible with the use of a polycarboxylic acid of formula XXVII.

Suitable amines include di- to hexavalent, mono or polynuclear carbo- or heterocyclic, aliphatic or cycloaliphatic compounds with up to 20 carbon atoms. Such compounds may also be substituted by halogen, nitro, halogenated alkyl, alkoxy, carboxyalkyl, carboxyaryl, acyl e.g. acetyl, or cycloalkyl, all with up to 18 carbon atoms. The aromatic group may also be a quinone. The organic group of the amine may be the same as those given above for A'.

Suitable isocyanates are those for formula (VIII) in which R''' has the above meaning and s is an integer of from 1 to 4.

The group R''' in the isocyanates may be mono to tetravalent and may be an aliphatic, cycloaliphatic, aromatic or mixed aromatic-aliphatic group with up to 20, preferably up to 15 carbon atoms, for example cyclohexyl, butyl, octyl, octadecyl, ethylene, propylene, butylene or a group of formula (47) and (48) in which X is —$CH_2$— or —O—, or of formula (49) to (XIX).

These groups may be substituted one or more times by alkyl, alkoxy or halogenoalkyl each with up to 5 carbon atoms; nitro; halogen, in particular F, Cl or Br. Suitable substituents include —$CH_3$, —$C_2H_5$, —$OCH_3$, —$OC_2H_5$, $CF_3$, several aromatic rings possibly being joined through —$CH_2$—, —O—, —S—, —S—S—, —$SO_2$—, —CO— or —N=N—. Preferably however not more than 5 H-atoms are substituted by such groups in any given R''' group.

Suitable tri- and tetravalent isocyanates include 2,4,6-triisocyanato-toluene; 4,4',4''-triisocyanatotriphenylmethane; 2,4,4'-triisocyanato-diphenylmethane; 2,2'.5.5'-tetraisocyanatodiphenylmethane; trivalent isocyanates of formula (XX) which may be obtained by the addition of trimethylolpropane to tolylene diisocyanate; an isocyanate of the formula (XXI) that may be obtained by reaction of hexamethylenediisocyanate and water or isocyanates with up to four free isocyanate groups of formula (XXII) such as may be produced by reaction of toluenediisocyanate and hexamethylene-diisocyanate. Suitable divalent isocyanates include 4,4'-diisocyanatodiphenylether, 4,4'-diisocyanatodiphenyl-ethane and 2,4-toluene-diisocyanate.

The tri- and tetraisocyanates may have the same substituents as those listed above for the diisocyanates.

In place of the free isocyanates, compounds that may form isocyanates may be used such as diphenylmethane-4,4'-bis(phenylcarbamate), diphenyl ether-4,4'-bis (butylcarbamate), and di-substituted carbamic acid amides such as diphenyl-4,4'-bis(carbamic acid diethylamide).

Other diisocyanates that may be reacted in accordance with equation (5) include those derived by means of equation (8) from monomeric diisocyanates and dicarboxylic acids. It is also possible that in compound (46) and polycarboxylic acid group may be replaced, at least partially, by an imide grouping of formula (VI).

The isocyanates can be used as such or as reaction products with terminal isocyanate groups, the reaction products having been prepared from isocyanates or precursors therefor and polycarboxylic acids (cf. equation 8, see the drawing).

Tri- or higher functional isocyanates or polycarboxylic acids may also be used. Their concentration however should not generally exceed 1 to 5 mol percent calculated on the appropriate amount of the same type of component since otherwise the optimum characteristics of the polycondensation products may not be obtained.

The synthesis of the isocyanates (46) may be carried out by reaction of ($n + 1$) moles of the diisocyanates (44) with n moles of the dicarboxylic acids (45) in inert solvents at temperatures of 0° to 200°C, preferably at 50° to 160°C. Suitable solvents are described below. The solutions of the isocyanates (46) may be used directly as such in the process according to the invention. They may also be obtained in solid form by precipitation, for example with acetone or toluene, and used in this form.

Suitable azomethine compounds include reaction products from 5-aminoisophthalic acid with salicylaldehyde, 1-hydroxy-2-naphthaldehyde (see formula (37)), 2-hydroxy-1-naphthaldehyde, 4-methylsalicylaldehyde, 4-carboxyethylsalicylaldehyde, 4-methoxysalicylaldehyde, 3-chloro- or 3-bromo-salicyclaldehyde, 4-acetylsalicylaldehyde, 4-hydroxydiphenyl-3-aldehyde, 3-hydroxydiphenyl-4-aldehyde or p-benzyl-salicylaldehyde.

Suitable azo compounds include those obtained by reaction of diazotised 5-aminoisophthalic acid with one of the following compounds (see formula 38): p-cresol, 2,4-dimethylphenol, 2,4-ditertiarybutylphenol, p-chlorophenol, 2,4-dichlorophenol, p-oxyacetophenone, hydroquinonemonoethylether, p-cyclohexylphenol, p-octylphenol, β-naphthol, 4-methyl-α-naphthol, 4-bromonaphthol, 4-hydroxydiphenyl, 4-hydroxy-4'-ethoxy-diphenyl or 4,4'-dihydroxydiphenylmethane-monomethylether.

Suitable chelate forming metals are those of the first to eighth group of the periodic table. Preferred metals are lithium, sodium, potassium, zinc, magnesium, barium, aluminium, titanium, lead, chromium, nickel, especially iron, cobalt and copper. Particularly suitable compounds for participation in chelate formation are oxides; hydroxides; carbonates; halides; alcoholates, for example methylates, ethylates, butylates, phenolates, as well as alcoholates of higher phenols, cresols and xylenols; acetates, formates; octoates; and naphthenates. Complex compounds of the metals, for example those of acetyl acetone or of enolised acetic anhydride are also suitable. In these compounds, the metals may be mono- or divalent or of a higher valency.

Suitable solvents in which the reaction products dissolve include phenols with up to 10 carbon atoms, such as phenol, cresol, mixtures or technical phenols, xylenol, dimethylformamide, dimethylacetamide, dimethylsulfoxide, N-methylpyrrolidine, N',N', N,N-tetramethylurea, N,N'N''-hexamethylphosphoric acid triamide, acetonitrile, ketones, such as acetone, methylethylketone, dibutylketone, cyclohexanone, acetophenone and isophorone, nitrobenzene, pyridine, tar base mixtures or mixtures of such solvents. In addition however up to 30 percent of higher boiling aromatics or hydroaromatics, for example diethylbenzene or decahydronaphthalene, or even glycol ethers, for example diethyleneglycoldimethylether or buranedioldiethylether may be mixed with the above solvents. The mixing can take place before, during or, if a solution of the products is to be prepared, after completion of the reaction.

The polymers are generally obtained in solution. They may be precipitated from such solutions by means of other solvents in which the reaction products obtained are insoluble or sparingly soluble for example ligroin, benzene, chlorobenzene, toluene, xylene, water, alcohols, acetone, aliphatic and/or aromatic hydrocarbons, carbon tetrachloride, cyclohexane, ethylacetate or butylacetate. They may be obtained as solids which are coloured to a greater or lesser degree. They may also be obtained as solids by evaporation of the solvent by means such as vacuum spray drying. Depending on the structure of the reaction products, the solvents named may function individually or in a mixture as such or as precipitants.

The mole ratios of the oxamide acid ester, isocyanate and polycarboxylic acid may be varied within wide limits. This can be illustrated by the following equation:

$$a.A' + C.C' = b.B'$$

in which
- $a$ is the number of oxamide acid ester groups in $A'$ moles oxamide acid ester,
- $b$ the number of isocyanate groups in $B'$ moles isocyanate,
- $c$ the number of carboxyl groups in $C'$ moles polycarboxylic acid, where $a$ and $b$ are 2,3 or 4 and $c$ is an integer of from 2 to 6. $A'$ is 0.97 to 0.03 mole, $C'$ is 0.03 to 0.97 mole, the sum of $A'$ and $C'$ is always 1. $(b.B')$ may be three times, preferably up to 1.1 times $(a.A' + c.C')$.

The oxamide acid esters, isocyanate and polycarboxylic acids may be present alone or as mixtures of their class of substance.

During the reaction between the oxamide acid esters, the isocyanates and the polycarboxylic acids, products with only a moderately high degree of polymerisation may be obtained with the above mole ratios depending on the reaction conditions. In this reaction for example one mole bisoxamide acid ester may react as one mole diisocyanate and thereafter with 1 mole of a di- or tricarboxylic acid anhydride or the free acid, only one isocyanate group being utilised for ring formation while the other takes over the role of condensation agent, i.e. the alcohol liberated during cyclisation is anchored in the compound formed in the form of a urethane group. This urethane group, which can be considered as a pseudo isocyanate reacts at elevated temperature with or without catalyst with a carboxyl group of the polycarboxylic acid, giving off alcohol and carbon dioxide, to yield an amide or imide compound. This reaction takes place according to equation (9) (see also equations (2) and (10)) with the formation of compound XXXIII. In addition however multiple forms of compound XXXIII may also be formed. In this case, $f$ is greater than 1 in this compound. The alcohol liberated during cyclisation can be combined intramolecularly with the polymers and/or extramolecularly with unreacted isocyanate. These products may contain these terminal groups

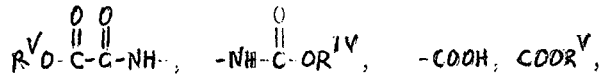 

$R^{IV}$ and $R^{V}$ may be different if a mixture of oxamide acid esters with different alkyl groups is used. In equations (9a) and (10a) the incorporation of the azomethine or azo compounds in such triketoimidazolidines is shown.

As will be readily seen, the process according to the invention allows one to react quite different starting material which may be monomeric, polymeric, straight chained or branched.

The process of the invention possesses still further advantages. While for example the reaction of polycarboxylic acids or their anhydrides with polyisocyanates, in itself known, frequently yields insoluble imide group containing polymers above 80°C whose processing is extraordinarily difficult, the reaction of the same components in the presence of an oxamide acid ester and an azomethine or an azo compound and/or their metal chelates in the above proportions, yields polymer solutions that can be readily processed.

The process of the invention can, in many cases, be accelerated by the use of suitable catalysts. Such catalysts are for example tertiary amines such as triethylamine, tributylamine, N,N-dimethylaniline, diazabicyclooctane, pyridine, N-Isobutylmorpholine, N-methylpiperidine, N,N-dimethylaniline, triethylenediamine, triphenylamine, triphenylphosphine, trimorpholinophosphine and N,N'-tetramethylethylenediamine; hexamethylphosphoric acid triamide; dibutyloxotin; dibutyltindilaurate; triphenylphosphite; alkyltitanates, e.g. tetrabutyltitanate; ferrocene; heavy metal complex compounds, such as iron acetylacetonate; and alcoholates or phenolates of metals of the first, second or third group of the periodic table such as lithiumbenzoate or calciumcarbonate; or mixtures of any of these catalysts. Other suitable catalysts include lithiummethylate; lithiumbenzoate; sodiumethylate; potassium tertiary butylate; as well as organo tin compounds such as dibutyltinoxide, dimethyltinstearate, dibutyltinglycolate, dibutyltindilaurate, diphenyltinoxide, ferrocene[dicyclopentadienyl-iron-(II)]; and metal chelates such as iron acetylacetonate and cobalt complexes; or mixtures of any of these catalysts.

The addition of the catalyst can take place prior to or during the condensation. It is also possible to add various catalysts at various times during the course of the reaction. The amount added may be from 0.001 to 5 percent by weight of the reaction mixture, preferably however from 0.05 to 1 percent.

When it has completed its task, the metal component of the catalyst can be used for building up the chelate system. This can be of particular importance if for example it is to be effective only during the first part of the reaction.

It is also possible to increase the molecular weight of the monomeric or higher molecular, for example oligomeric reaction products, prepared by the process of the invention, still further by a thermal treatment at temperatures of from 200° to 550°C, preferably from 260° to 480°C and thus achieve highly thermostable products that are practically insoluble in conventional solvents.

If monomeric products are desired, at least on mone functional reaction component is used as starting material, for example a monoisocyanate, a monooxamide acid ester, or possibly a monocarboxylic acid.

Polymers that still contain polymerisable groups may also be prepared. For example the products may contain the groups —NH—COOR$^{IV}$, —NH—CO—COOR$^{V}$ (described in the following with Q and Q'), —COOH,—COOR$^{V}$, —COOR$^{IV}$ and —N=C=O, in which R$^{IV}$ and R$^{V}$ have the above meaning and may be the same or different, in accordance with equation (7b), when the above named symbols apply and $n$ is an integer from 1 to 70, preferably 1 to 50. Such reaction products, whether in solution or in solvent free form, in the fused or solid state, may be heated to 120° to 550°C, preferably to at least 200°, especially to 280° to 450°C to yield film forming polymers that are resistant to chemicals and temperature and are practically insoluble. If the reaction temperature is for example from 150° to 300°C, the reaction of the terminal groups Q and Q' will proceed at an adequate rate. "Polymerisation" in this context is intended to mean chain extension through addition and/or condensation. The polymers may be separated by precipitation and filtration. They are light yellow to brownish powders which surprisingly may be readily soluble. They may be precipitated from such a solution by the addition of, for example, water or alcohol. The compounds may be obtained as a powder or in crystalline form for example microcrystalline substances.

Depending on the reaction conditions chosen, products of varying degrees of polymerisation may be produced by the process claimed (compare formula XI, in which $n$ may be an integer of from 1 to 70). Normally, products with medium molecular weight are obtained and these products have a comparatively good solubility in the usual aprotic solvents. (e.g. dimethylformamide, N-methylpyrrolidone, dimethylsulfoxide and N,N',N''-hexamethylphosphoric acid triamide). One can obtain 30 to 70 percent solutions in the above aprotic solvents without the viscosity of the latter being too high. The solutions remain unchanged even during storage and do not tend to crystallise. These characteristics, combined with good processing properties and versatile application of the products make possible the preparation of polymeric, heterocyclic compounds. Because of their high molecular weight, the products shown an improvement of the film forming characteristics and high thermal stability. After curing polymers that are insoluble in most solvents are obtained. These insoluble polymers may, under certain conditions, be prepared in one stage. This may be of advantage in the preparation of chemically stable mouldings.

The thermostability is particularly high with products containing a low amount of hydrogen, but particularly in the absence of aliphatically or cycloaliphatically combined hydrogen in the heterocycle system. The films and foils that are obtained from the preliminary products claimed are distinguished by excellent elasticity characteristics. Adhesion to metal surfaces is very good.

The yields of the 2,4,5-triketoimidazolidines prepared by the process of the invention may be more than 90 percent of the theory.

The monomeric and polymeric, particularly the low molecular compounds prepared in accordance with the invention can be used with extraordinary versatility, for example they are valuable intermediate products for organic syntheses. They serve, especially in their low molecular form, as starting materials for the preparation of pesticides such as insecticides, mycocides and bactericides and in the synthesis of dye stuffs and plastics and for the stabilisation of high molecular substances, preferably polymerisation of condensation resins. The products obtained are also suitable as stabilisers for polymer products, especially for polymerisation and/or polycondensation resins. They may however also be mixed with such polymers, including polymerisation and/or condensation resins with heterocyclic groups, at temperatures of $-10°$ to $+250°C$, preferably at $+20°$ to $190°C$ in solution, melt or in the solid phase and processed to mouldings and/or coatings.

The low or high molecular products or solutions of the polymers with chelate forming groups or chelate grouping obtained are generally highly viscous solutions coloured yellow to red orange brown. The inherent viscosity is approximately 0.2 to 1.2, measured on 1 percent solutions in dimethylacetamide or N-methylpyrrolidone.

The polymers obtained have high heat stability, good flame retardancy and excellent adhesion on a variety of substrates especially metallic and silicate surfaces.

Surprisingly, it was found that polymers in whose preparations small amounts of a chelate forming agent, for example even of 0.02 mole/mole polymer unit, yielded solutions that had a far longer shelf life compared with solutions without chelate forming agents. They did not change their viscosity over a period of months while comparative solutions more than doubled their starting viscosity during this period.

Moreover, it was noticed that as a result of such small amounts of an incorporated chelate forming agent, far lighter polymer solutions, compared with solutions without chelate forming agents are obtained. Films produced from these solutions were far paler, tending to be yellow instead of brown orange, than films from polymers without chelate forming substances. This is thought to be due to the blocking effect on heavy metal traces present in the starting materials used. These traces catalyse autoxidation processes and thus lead to discolouration. The extraordinary thermostability of the polymers in an oxygen containing atmosphere may be due to the same reason.

The products prepared by the process according to the invention are particularly suitable for the coating of metals, especially metallic mouldings such as wire, sheet, plates, tubes, preferably electric conductors when it does not matter whether the application is effected in powder form or in solution. In the same way, they may also be applied to ceramic mouldings. After thermal polycondensation, or after cross-linking with chelate formation, thermo stable coatings that adhere well to such objects and that even have high temperature resistance are obtained. The products are also suitable, especially in powder form, after mixing with fillers, especially of an inorganic nature, for example mineral powders, glass flour, glass fibres, asbestos fibres, graphite, metal powders and chips, for the preparation of moulded components by the heat moulding process. With these fillers, the products obtained by the process according to the invention can be processed at high temperatures, for example at 280° to 500°C, and high pressure, for example 50 to 5000 atmospheres to give mouldings. Moreover, they are particularly suitable for the preparation of glass clear foils and films. The products also show good thermostability and flame retardancy. Moreover, like the coatings, they may have a high surface hardness with constant elasticity. They also display high elasticity at low temperatures, high softening points (340° to over 400°C) and high resistance to permanent thermal stress. The products show very good adhesion to a variety of substrates especially metallic and silicate surfaces, and are therefore suitable for use in the preparation of laminates. By suitable means, for example the addition of propellants, although a propellant may not always be necessary as liberated alcohol and carbon dioxide may act as the propellant, the products can be converted into foamed materials with high temperature resistance which is of importance particularly for insulation purposes.

In order that the invention may be well understood the following Examples are given by way of illustration only.

EXAMPLE 1

In a 10 litre three necked flask, 564 gram (1 mole) of 4,4'-bis(4-carboxyphthalimido)-diphenylsulfonate and 548 gram (1 mole) of 4,4'-bis(4-carboxyphthalimido)-diphenylether are suspended in 2800 ml N- methylpyrrolidone and 2000 ml dimethylsulfoxide at 60°C. 67 gram (0.2 mole) of the azomethine (melting point = 300°C with decomposition) of 2-hydroxynaphthaldehyde-1 and 5-aminoisophthalic acid are then added. The mixture is heated to 140°C. At this temperature, 199 gram (0.5 mole) of 4,4-bis-(ethoxalylamino)-diphenylmethane, 176.4 gram (0.7 mole) 4,4-diisocyanato-diphenylether and 500 gram (2.0 mole) of 4,4'-diisocyanato-diphenylmethane are added over a period of 3 hours. Stirring is continued at 150°C until no more $CO_2$ is evolved (approximately 6 to 8 hours). After the addition of 2 gram tributylamine, the temperature is increased to 200°C and maintained there for 4 hours. Subsequently, 400 ml cyclohexanone and 200 ml diethylbenzene are introduced as diluent. After cooling, a pale orange yellow, highly viscous polymer solution is obtained. The solids content is approximately 25 percent by weight. Yield: 7200 grams. The inherent viscosity of the polymer is at ca. 0.44 (20°C) measured in a 1 percent solution.

EXAMPLE 2

158.8 grams (0.8 mole) of 4,4-diaminodiphenylmethane are dissolved with stirring in 1280 ml N-methylpyrrolidone at room temperature. 307.2 grams (1.6 mole) of trimellitic anhydride are then added in portions at 80°C. After addition of toluene as an azeotropic agent, the temperature is raised to 180°C and condensation continued until no more water is evolved. This occurs after approximately 2 hours. 79.6 gram (0.2 mole) of 4,4'-bis-ethoxalylaminodiphenylmethane and 11.4 grams (0.04 mole) of azomethine (melting point = 287°C) from 5-aminoisophthalic acid and salicylaldehyde are then added. After cooling to 160°C, 250 grams (1 mole) of 4,4'-diisocyanato-diphenylmethane are introduced. Condensation is carried out at 160° to 180°C until no more $CO_2$ is evolved. Subsequently the temperature is raised to 205°C and the alcohol liberated during condensation distilled through a packed tower in such a manner that the temperature at the head of the column does not exceed 125°C. Thereafter, the mixture is cooled and diluted with 100 ml dimethylacetamide, 100 ml hexamethylphosphoric acid triamide and 90 ml cyclohexanone.

2300 grams of a yellow brown, high viscosity solution with a solids content of approximately 31 percent are obtained. The inherent viscosity of the polymer, measured in a 1 percent solution, is 0.50 (20°C).

EXAMPLE 3

158.5 gram (0.8 mole) of 4,4-diaminodiphenylmethane are dissolved in 800 ml N-methylpyrrolidone and 50 ml dimethylsulfoxide and 307.2 g (1.6 mole) of trimellitic anhydride are added at 60°C. The temperature then rises to 95°C. After the addition of toluene as an azeotropic agent, condensation is continued at 185°C until no more water is evolved. Thereafter, the mixture is cooled to 80°C and 235 grams (0.94 mole) of 4,4'-diisocyanatodiphenylmethane, dissolved in 440 ml of N-methylpyrrolidone are added dropwise over a period of 30 minutes. After stirring for 3 hours, the temperature is increased to 200°C and 39.8 grams (0.1 mole) of 4,4'-bisethoxalylaminodiphenylmethane stirred in with 11.4 grams (0.04 mole) of the azomethine from 5-aminoisophthalic acid and salicylaldehyde. Finally, as in Example 2, the alcohol is distilled off. After cooling to 140°C, dilution is carried out with 300 ml N-methylpyrrolidone and 50 ml isophorone. When the solution reaches room temperature, 2300 gram of a highly viscous, red orange coloured polymer solution with a solids content of 30 percent are obtained.

The polymer precipitated from the polymer solution with aceto alcohol mixture had an inherent viscosity of 0.77 in a 1 percent solution in N-methylpyrrolidone.

EXAMPLE 4

218.4 g (0.4 mole) of 4,4'-bis-(4-carboxyphthalimido)-diphenylmethane and 3.55 grams (0.01 mole) of 5-(4-carboxyphthalimido)-isophthalic acid (XXXVII) are dissolved in 400 ml N-methylpyrrolidone and 39.8 grams (0.1 mole) of 4,4'-bisethoxalylaminodiphenylmethane stirred in at 220°C. After cooling to 100°C a solution of 130 grams (0.52 mole) of 4,4'-diisocyanatodiphenylmethane in 260 ml N-methylpyrrolidone is added dropwise over a period of 2 hours. After addition of 0.5 gram dibutyltindilaurate condensation is continued at 170°C until no more $CO_2$ is evolved. After raising the temperature to 200°C, 2.85 gram (0.01 mole) of the azomethine from 5-aminoisophthalic acid and salicylaldehyde are added. At this temperature, the alcohol liberated during condensation is distilled off as described in Example 2. Subsequently, the solution is heated to 205°C and 4.9 grams cobaltoctoate, dissolved in 20 grams dimethylsulfoxide, added and diluted with 200 ml N-methylpyrrolidone. After cooling to room temperature, 1150 grams of a clear, high viscosity, brown orange coloured solution with a solids content of approximately 20 percent are obtained. Inherent viscosity: 0.67 (1 percent solution of the polymer in N-methylpyrrolidone at 20°C). The softening point of the polymer is about 350°C. In place of the above named isophthalic acid derivative, equimolecular amounts of the compounds XXVIII or XXXVIII may also be used. In this way, the softening points can be raised to 370° and to 390°C.

EXAMPLE 5

79.2 grams (0.4 mole) of 4,4-diaminodiphenylmethane and 153.6 grams (0.8 mole) of trimellitic anhydride are stirred with 200 ml N-methylpyrrolidone and 200 ml dimethylsulfoxide. After addition of xylene as an azeotropic agent, condensation is carried out at 190°C until no more water is evolved. Thereafter, the solution is cooled to 120°C and 2.5 grams triethylamine and 0.5 grams butyltitanate added. Subsequently, 39.8 grams (0.1 mole) of 4,4'-bis(ethoxalylamino)-diphenylmethane and 6.7 grams (0.02 mole) of the azomethine from 5-aminoisophthalic acid and 2-hydroxynaphthaldehyde-1 are added. 130 grams (0.52 mole) of 4,4'-diisocyanatodiphenylmethane dissolved in 260 ml N-methylpyrrolidone and then dropwise over a period of 1 hour at 100°C. After completion of this addition, the solution is heated to 202°C and condensation completed at this temperature for 6 hours. After cooling to 160°C, the solution is diluted with 200 ml cyclohexanone. 1160 grams of a light yellow, clear polymer solution with a solids content of approximately 30 percent is obtained. The viscosity of the solution is approximately 24000 cP (20°C).

EXAMPLE 6

398 grams (1 mole) of bis-ethoxalyl-aminodiphenylmethane, 67 grams (0.2 mole) azomethine from 2-hydroxynaphthaldehyde-1 and 5-aminoisophthalic acid are dissolved in 600 ml of N-methylpyrrolidone at 60°C. Thereafter, 340 grams (1.22 mole) of 4,4'-diisocyanato-diphenylether are added. The temperature is then increased to 150°C. The reaction mixture is maintained at this temperature until no more $CO_2$ is evolved. Subsequently, the mixture is heated for 4 hours to 205°C until no more ethyl-alcohol is given off. A clear, light yellow brown viscous solution, with an inherent viscosity of 0.4 (20°C) is obtained. The solids content is approximately 50 percent by weight, yield: 1305 grams.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

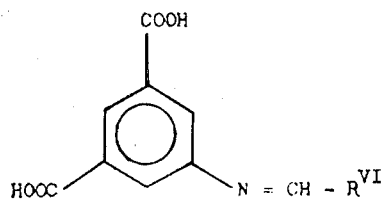

(37)

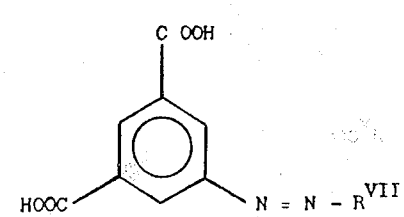

(38)

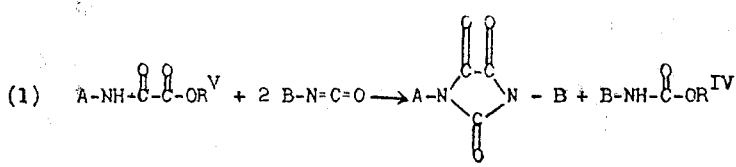

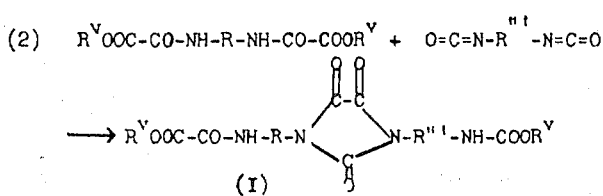

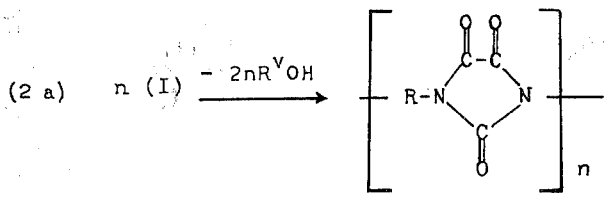

n = 1 – 70

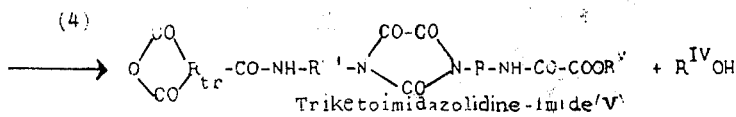

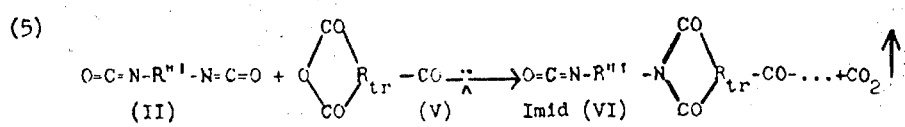

—Continued
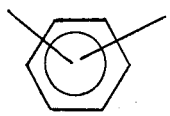
(47)
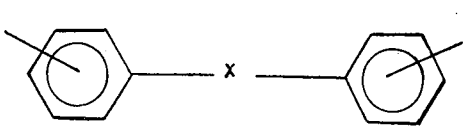
(48)
(49)
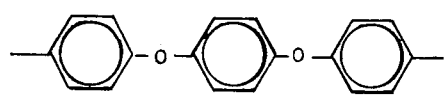
(XV)
$$R^VOOC - \underset{\underset{O}{\|}}{C} - NH - A' - NH - \underset{\underset{O}{\|}}{C} - COOR^V$$
(50)
$R-(NH-CO-CO-OR^V)_r$     (VII)
$R_{poly}(COON)_p$     (44)
$R'''-(N=C=O)_g$     (VIII)
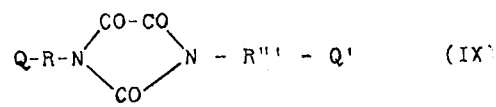     (IX)
(8)   $(n+1)O=C=N-R'''-N=C=O \; + \; n \cdot HOOC-R_{poly}-COOH \xrightarrow{-2n\,CO_2}$
          (II)                                  (45)
$O=C=N-R'''-NH-\left[CO-R_{poly}-CO-NH-R'''\right]_n-N=C=O$    n = 4 bis 10
                                  (46)
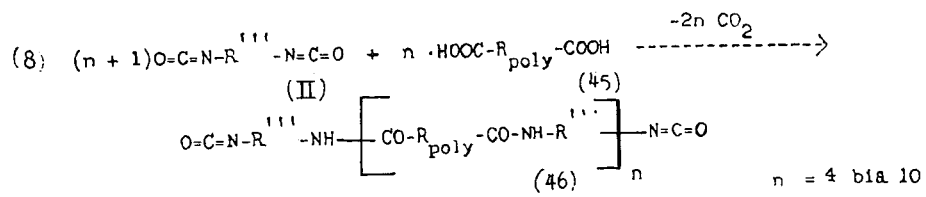
(39)
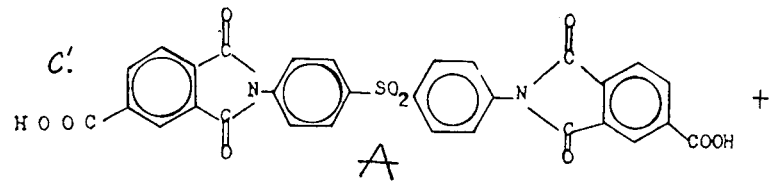
(40)
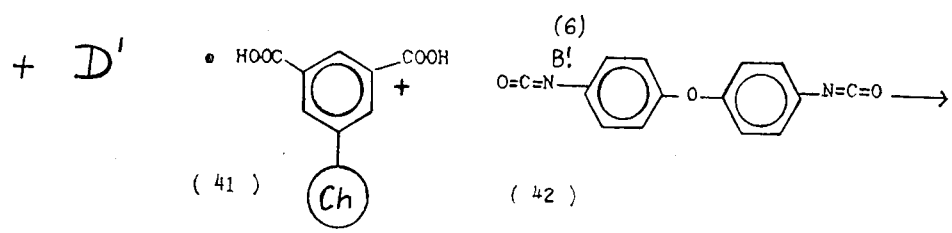
(41)       (42)

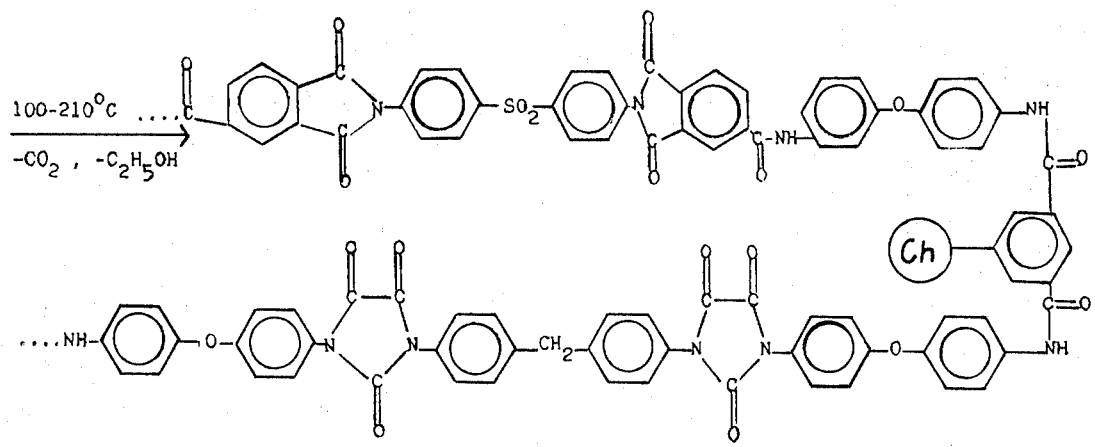
(43)
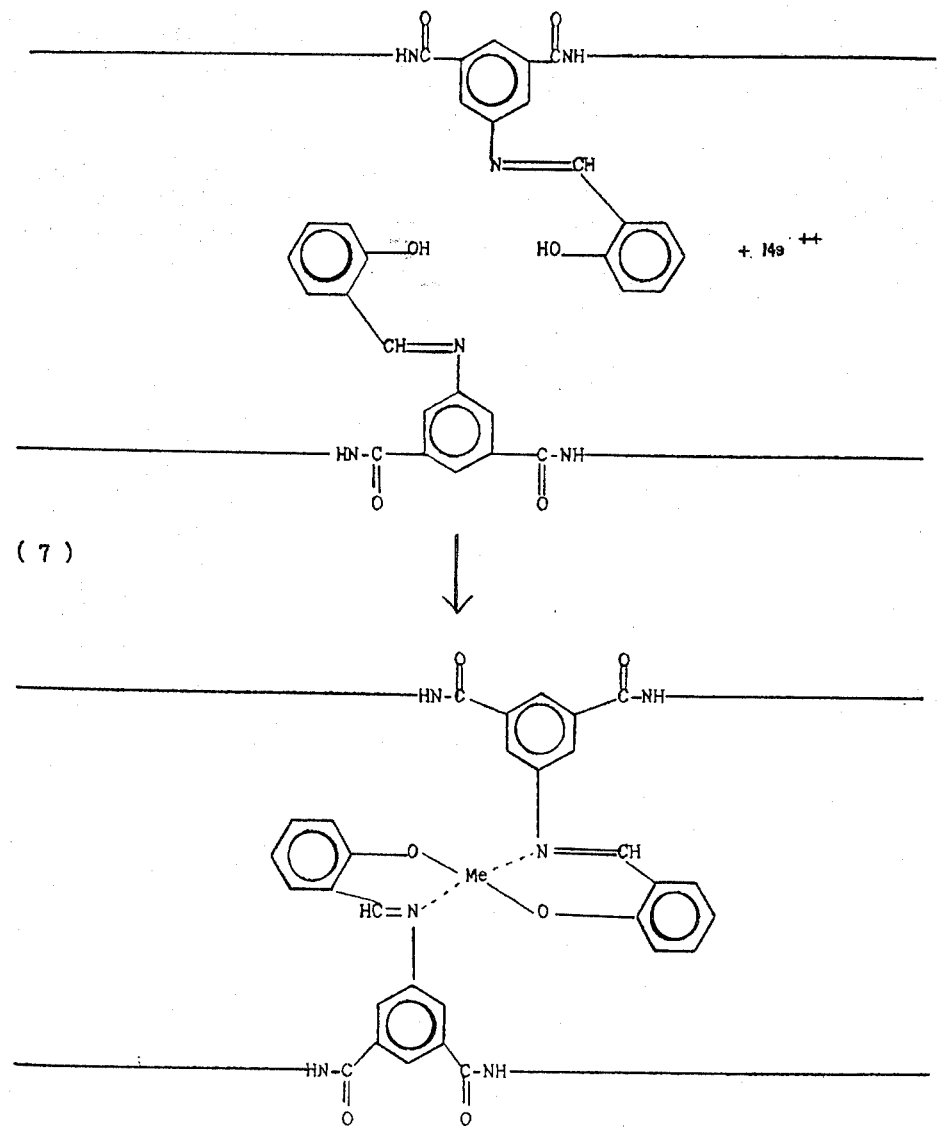
(7)

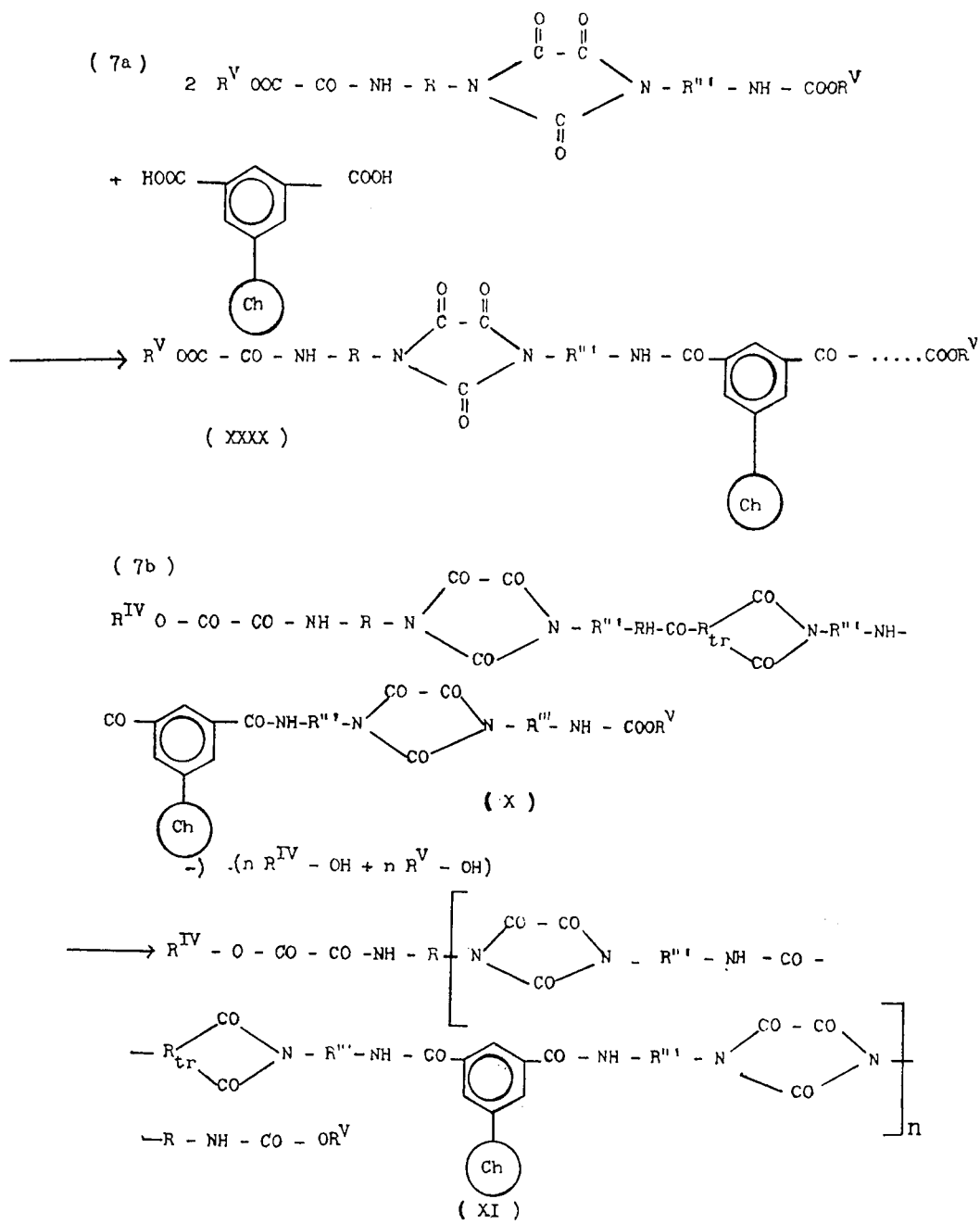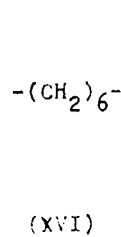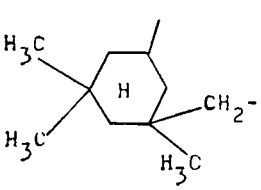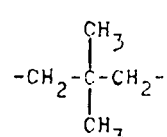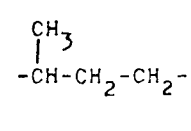
(XVI)     (XVII)     (XVIII)     (XIX)

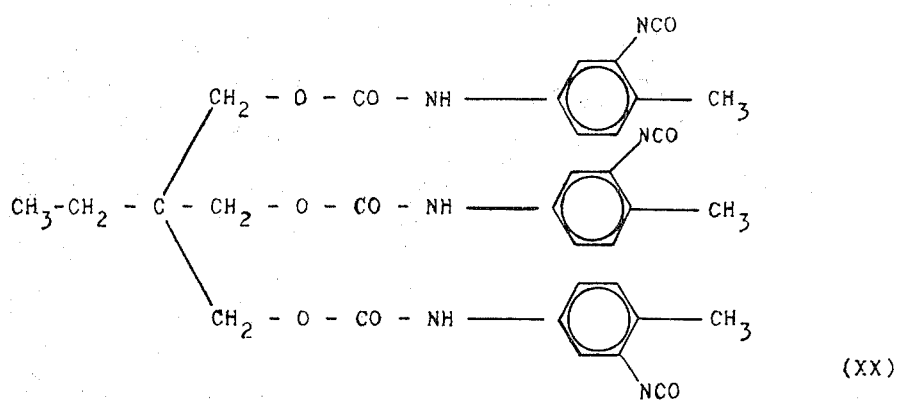
(XX)
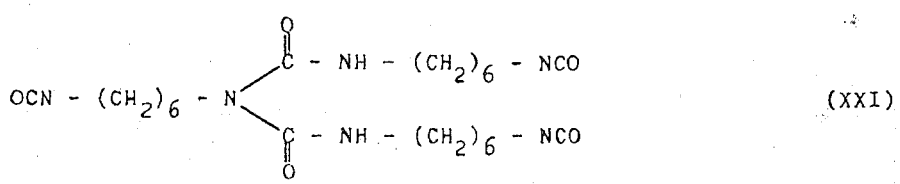
(XXI)
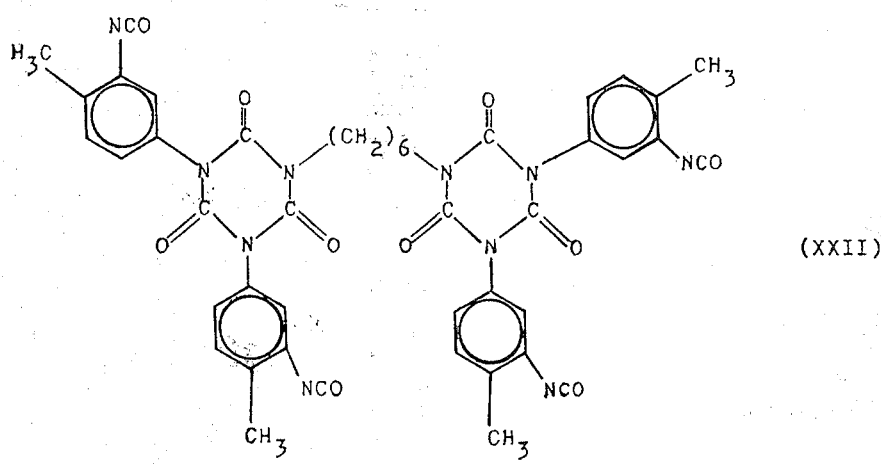
(XXII)
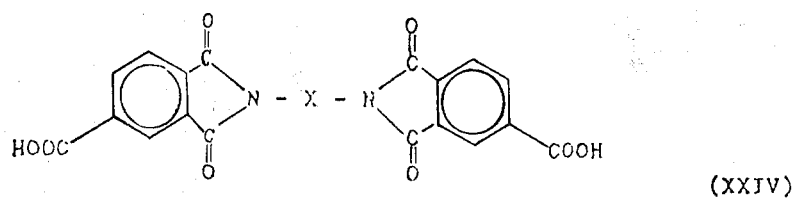
(XXIV)
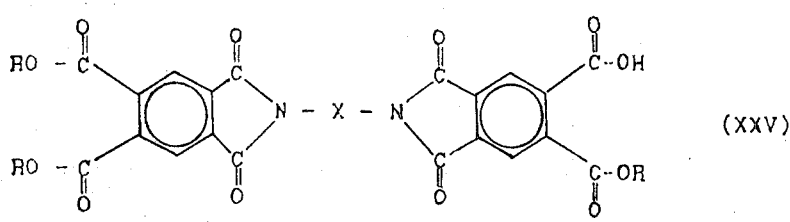
(XXV)
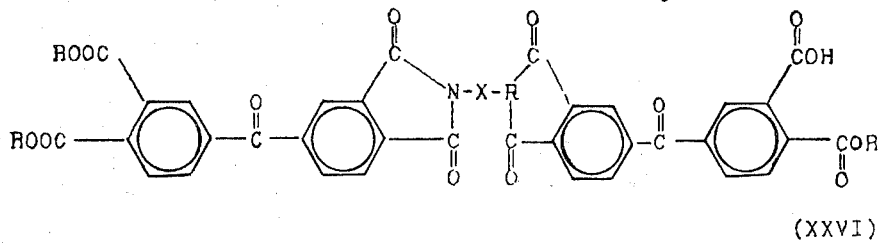
(XXVI)

—Continued
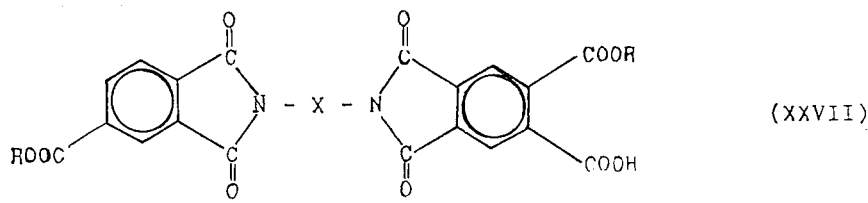
$X = (CH_2)_m \quad m = 2 - 8$
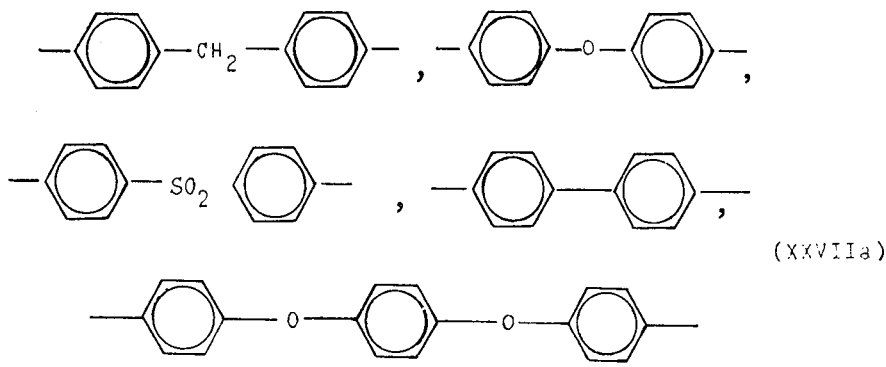
(XXVIIa)
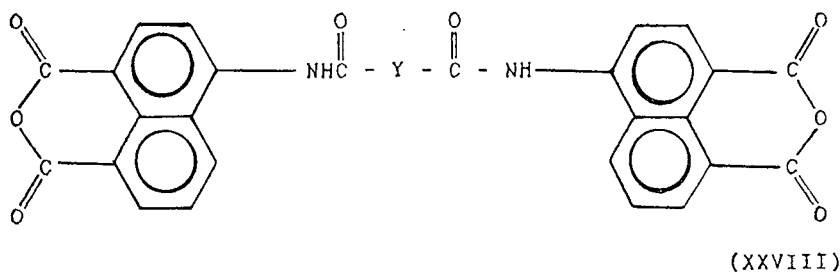
(XXVIII)
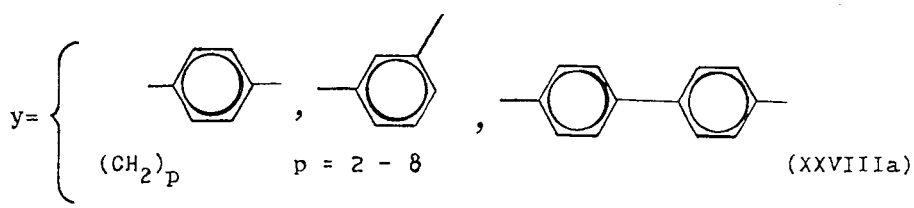
$y = \{ \ldots, (CH_2)_p \quad p = 2 - 8 \}$ (XXVIIIa)
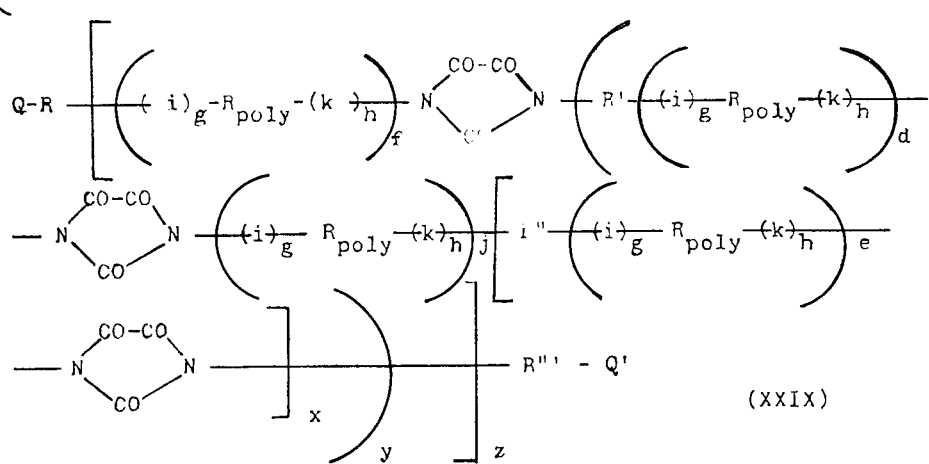
(XXIX)

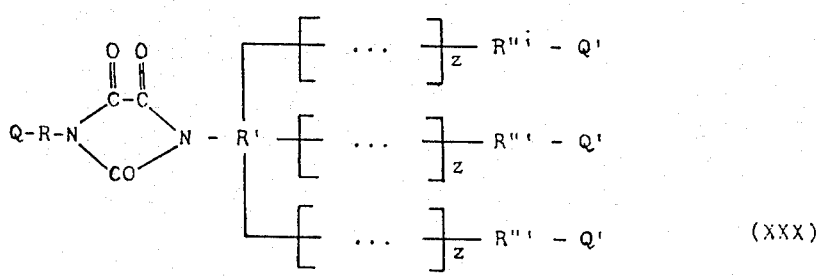
(XXX)
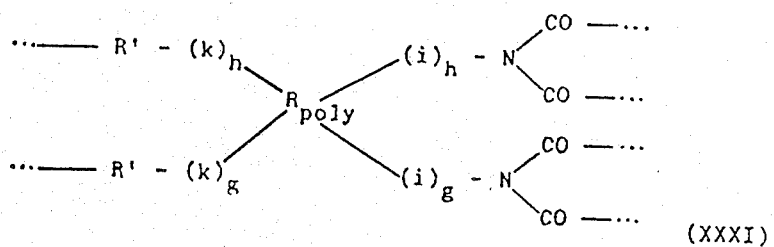
(XXXI)
$$H_2C = (C_6H_4 - NH - CO - COOC_2H_5)_2 \quad (XXXII)$$
$$Q - R - Q' + R''' \mathrel{\mathop:}= N = C=O)_2$$
(XXXIIa)
$$\rightarrow Q - R \xrightarrow{\phantom{xx}}_f N \begin{smallmatrix} CO - CO \\ CO \end{smallmatrix} N - R''' - NH - COOR^V \quad (XXXIII)$$
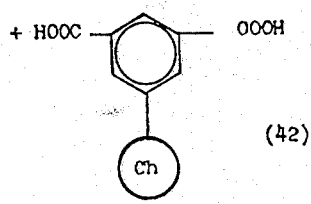
(42)
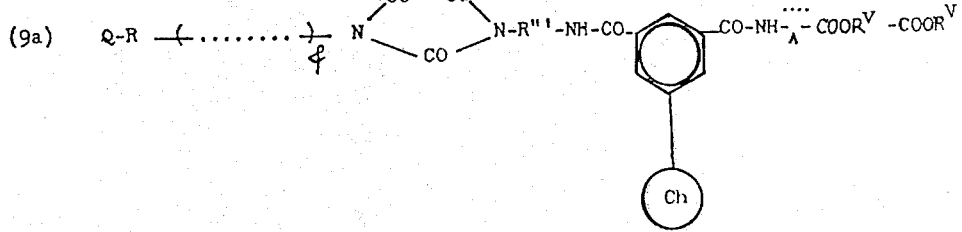
(9a)
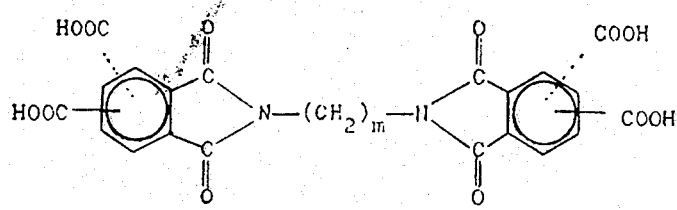
XXXIV
m = 2-6

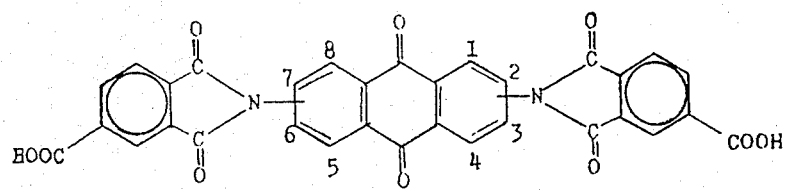
XXXV
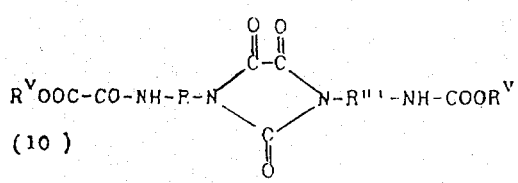
+ Verbindung XXIV  or (37) or (38)
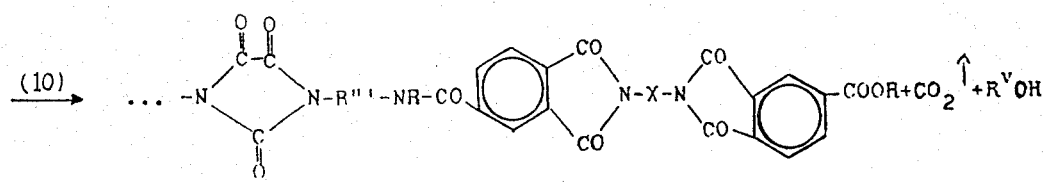
or  XXXVI
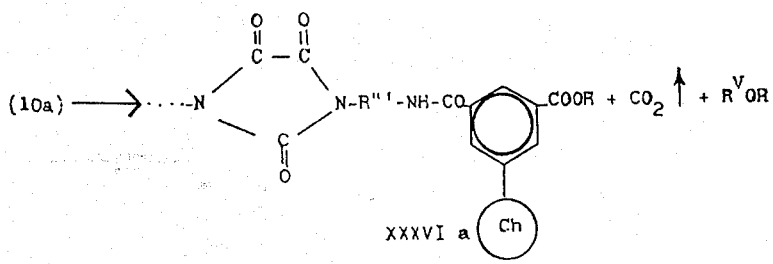
XXXVI a
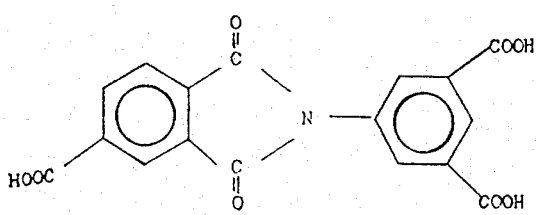
(XXXVII)
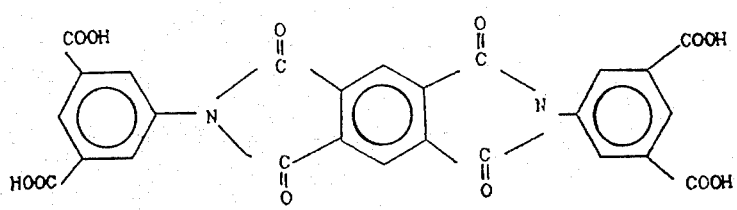
(XXXVIII)
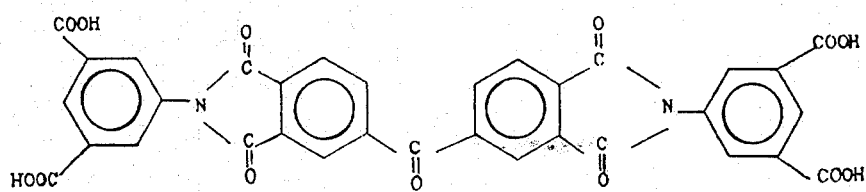
(XXXIX)

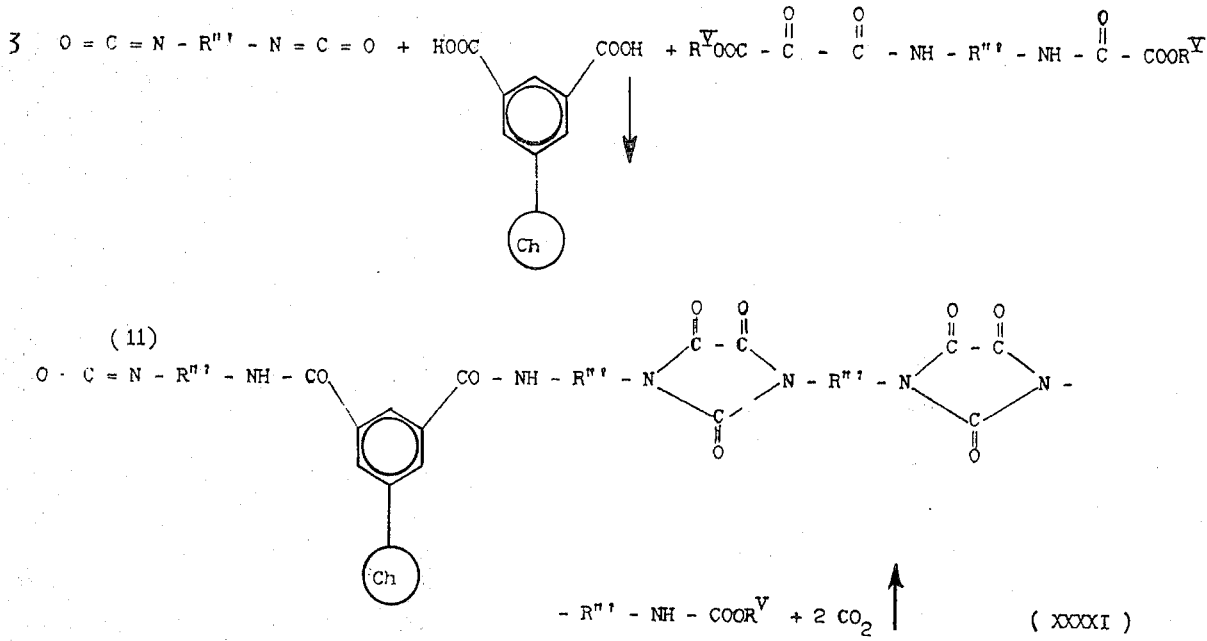

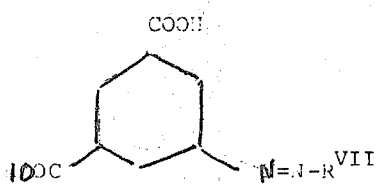

What we claim is:

1. A process for the manufacture of modified N,N'-substituted 2,4,5-triketoimidazolidines which comprises reacting
   (a) at least one oxamidic ester of Formula VII $$R-(NH-CO-CO-OR^I)_r \qquad (VII)$$

wherein:
   R is a mono- or polynuclear, mono to hexavalent carbocyclic or heterocyclic aromatic including quinone group and having up to 20 carbon atoms being unsubstituted or substituted by at least one substituent having up to 18 carbon atoms selected from the group consisting of halogen, nitro, dialkylamino, diarylamino, alkylarylamino and halogenated or unhalogenated alkyl, alkoxy, carboxyalkyl, carboxyaryl and acyl groups,
   $r$ is an integer of from 1 to 6, and wherein
   $R^I$ is individually selected from the group consisting of an aliphatic hydrocarbon group having up to 18 carbon atoms, a cycloaliphatic hydrocarbon group with up to 8 carbon atoms, a mononuclear aromatic hydrocarbon group being unsubstituted or substituted by at least one hydrocarbon group and having a total of up to 14 carbon atoms
   (b) at least one organic isocyanate, and (D) at least one compound selected from the group consisting of
   (d) an azomethine of Formula (37)

(37) 

 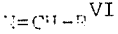 VI (e) a metal chelate of component (d),
   (f) an azo compound of Formula (38),

(38) 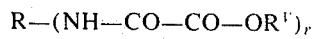 VIII (g) a metal chelate of component (f),
   wherein
   $R^{VI}$ is an aromatic group having at least one aromatic nucleus and having from 6 to 14 carbon atoms and containing a hydroxy group ortho to the azomethine group, a substituted product thereof having from 6 to 22 carbon atoms and having at least one substituent selected from the group consisting of alkyl, cycloalkyl, benzyl, hydroxy, methoxy, aryl, aryloxy, carboxyl, acyl, nitro, and halogen, each substituent containing up to 6 carbon atoms,
   $R^{VII}$ is an aromatic group having 6 to 14 carbon atoms and containing a hydroxy group ortho to the azo group, a substituted product thereof having up to 22 carbon atoms and having at least one substituent selected from the group consisting of alkyl, cyclohexyl, alkoxy, acyl, carboxyalkyl, a fluorcarbon group or halogen, each substituent containing up to 6 carbon atoms
   so as to obtain a reaction product of modified N,N'-substituted 2,4,5-triketoimidazalidine.

2. A process as claimed in claim 1 wherein the molar ratio of the oxamidic acid ester to the total of components (d) to (g) is (2 to 94) : (0.1 to 50), wherein the total is 100 mol percent.

3. A process as claimed in claim 1 wherein there is employed as an additional reaction component (c) a polycarboxylic acid having 4 to 70 carbon atoms and up to 6 carboxyl groups is present in an amount of 5 to 95 mol percent, referred to one of the other reactants (a) and (b) wherein the total of the polycarboxylic acid and of the other reactant is 100 mol percent.

4. A process as claimed in claim 1 wherein anyone of the components (d) to (g) is present in an amount of at least 0.02 mol per mol of the reaction product and wherein the reaction with components (d) to (g) is performed at an elevated temperature in a liquid phase selected from the group consisting of (i) a melt and (k) in the presence of a solvent without or with a metal compound as a catalyst wherein the catalyst is selected from the group consisting of organo tin compounds, alkyltitanates, heavy metal complex compounds, alkylates and phenolates of metals of the first, second and third groups of the Periodic Table, alkali metal benzoates, chelates of iron and cobalt, and mixtures thereof, which catalyst is subsequently chemically built into the reaction product.

5. A process as claimed in claim 1 wherein the azomethine compound (d) is a reaction product of a 1-hydroxyaldehyde with 5-amino-isophthalic acid and wherein the azo compound (f) is a reaction product of diazotised 5-aminoisophthalic acid with an aromatic hydroxy compound.

6. A process as claimed in claim 1 wherein the reaction products are precipitated from the solution obtained by addition of at least one other solvent in which the reaction products are insoluble or sparingly soluble.

7. A process as claimed in claim 1 wherein the oxamidic ester and at least one of the components (d) to (g) are mixed and the isocyanate is subsequently added and the reaction product further reacted with a chelate forming metal compound (h) of a metal of the 1st to 4th or 8th group of the Periodic Table in an amount which is practically equimolecular to the amount of the celate forming groups.

8. A process for the manufacture of modified N,N'-substituted 2,4,5-triketoimidazolidines which comprises reacting (a) at least one oxamidic ester of Formula VII $$R—(NH—CO—CO—OR^I)_r$$

(VII)

wherein:
R is a mono- or polynuclear, mono to hexavalent carbocyclic or heterocyclic aromatic including quinone group and having up to 20 carbon atoms being unsubstituted or substituted by at least one substituent having up to 18 carbon atoms selected from the group consisting of halogen, nitro, dialkylamino, diarylamino, alkylarylamino and halogenated or unhalogenated alkyl, alkoxy, carboxyalkyl, carboxyaryl and acyl groups,
$r$ is an integer of from 1 to 6, and wherein
$R^I$ is individually selected from the group consisting of an aliphatic hydrocarbon group having up to 18 carbon atoms, a cycloaliphatic hydrocarbon group with up to 8 carbon atoms, a mononuclear aromatic hydrocarbon group being unsubstituted or substituted by at least one hydrocarbon group and having a total of up to 14 carbon atoms, (b) at least one organic isocyanate, and (D) at least one compound selected from the group consisting of (d) an azomethine of Formula (37)

(37) 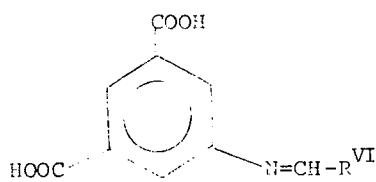

(e) a metal chelate of component (d),
(f) an azo compound of Formula (38),

(38) 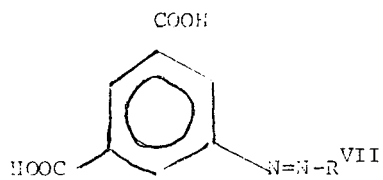

(g) a metal chelate of component (f),
wherein:
$R^{VII}$ is an aromatic group having at least one aromatic nucleus and having from 6 to 14 carbon atoms and containing a hydroxy group ortho to the axomethine group, a substituted product thereof having from 6 to 22 carbon atoms and having at least one substituent selected from the group consisting of alkyl, cycloalkyl, benzyl, hydroxy, methoxy, aryl, aryloxy, carboxyl, acyl, nitro, and halogen, each substituent containing up to 6 carbon atoms,
$R^{VIII}$ is an aromatic group having 6 to 14 carbon atoms and containing a hydroxy group ortho to the azo group, a substituted product thereof having up to 22 carbon atoms and having at least one substituent selected from the group consisting of alkyl, cyclohexyl, alkoxy, acyl, carboxyalkyl, a fluorcarbon group or halogen, each substituent containing up to 6 carbon atoms,
(c) 9 to 95 mol percent of a polycarboxylic acid having 4 to 70 carbon atoms and up to 6 carboxyl groups at a temperature between −20° and 280°C so as to obtain a reaction product of modified N,N'-substituted 2,4,5-triketoimidazolidine which is subsequently separated or reacted with
(h) a chelate forming metal compound
wherein
the total molar number of the reaction components (a), (c) and (d) to (g) is (0.95 to 1.07) times the molar number of the isocyanates; and wherein the amount of the components (d) to (g) is 0.1 to 50 mol percent, that of the oxamide ester is 1 to 94 mol percent; and wherein the said molar amounts are all referred to the same functionality of the reaction components.

9. An N,N'-substituted 2,4,5-triketoimidazolidine obtained by reacting
(a) at least one oxamidic ester of Formula VII $$R—(NH—CO—CO—OR^I)_r$$

(VII)

wherein:
R is a mono-or polynuclear, mono to hexavalent carbocyclic or heterocyclic aromatic including quinone group and having up to 20 carbon atoms being unsubstituted or substituted by at least one substituent having up to 18 carbon atoms selected from the group consisting of halogen, nitro, dialkylamino, diarylamino, alkylarylamino and halogenated or unhalogenated alkyl, alkoxy, carboxyalkyl, carboxyaryl and acyl groups,
$r$ is an integer of from 1 to 6, and wherein
$R^I$ is individually selected from a group consisting of an aliphatic hydrocarbon group having up to 18 carbon atoms, a cycloaliphatic hydrocarbon group with up to 8 carbon atoms, a mononuclear aromatic hydrocarbon group being unsubstituted or substituted by at least one hydrocarbon group and having a total of up to 14 carbon atoms,
(b) at least one organic isocyanate and (D) at least one compound selected from the group consisting of
(d) an azomethine of Formula (37)

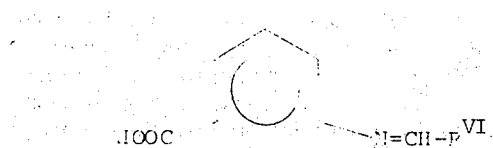

(e) a metal chelate of component (d),
(f) an azo compound of Formula (38),

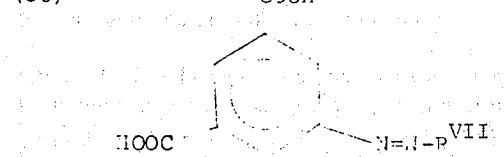

(g) a metal chelate of component (f),
wherein
R$^{VI}$ is an aromatic group having at least one aromatic nucleus and having from 6 to 14 carbon atoms and containing a hydroxy group ortho to the azomethine group, a substituted product thereof having from 6 to 22 carbon atoms and having at least one substituent selected from the group consisting of alkyl, cycloalkyl, benzyl, hydroxy, methoxy, aryl, aryloxy, carboxyl, acyl, nitro, and halogen, each substituent containing up to 6 carbon atoms,
R$^{VII}$ is an aromatic group having 6 to 14 carbon atoms and containing a hydroxy group ortho to the azo group, a substituted product thereof having up to 22 carbon atoms and having at least one substituent selected from the group consisting of alkyl, cyclohexyl, alkoxy, acyl, carboxyalkyl, a fluorcarbon group or halogen, each substituent containing up to 6 carbon atoms
so as to obtain a reaction product of modified N,N'-substituted 2,4,5-triketoimidazolidine.

10. The compound of claim 9 which is a reaction product of (a) a bis-(ethoxyalkylamino)-derivative of a diphenyl compound of Formula (48)

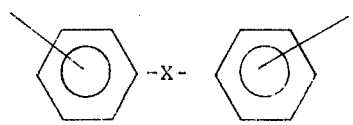

wherein X is —CH$_2$— or —O—,
(b) a diisocyanate of Formula (VIII)

$$R''' - (N=C=O)_s$$

(VIII)

wherein R''' is an aromatic or mixed aromatic-aliphatic group of Formula (48), and wherein X is —CH$_2$— or —O—, and having up to 15 carbon atoms, s is 2 and (D) at least one compound selected from the group consisting of
(d) an azomethine compound which is the reaction product of 4-aminoisophthalic acid and salicylaldehyde, and
(f) an azo compound prepared from diazotized 5-aminoisophthalic acid, p-cresol or β-naphthol.

11. The compound of claim 9 which is a reaction product of
(a) 4,4'-bis-(ethoxalylamino)-diphenylmethane,
(b) 4,4'-diisocyanato-diphenylmethane and
(D) a reaction product of 5-aminoisophthalic acid and salicylaldehyde.

12. A product as claimed in claim 9, dissolved in an aprotic solvent, wherein the content of said product being in the range from 30 to 70 percent by weight.

13. A product as claimed in claim 9 being an essential ingredient in a film, a coating or in a shaped article.

14. A product as claimed in claim 13 wherein the shaped article also contains as a further essential ingredient a mineral filler selected from the group consisting of glass fiber and graphite.

15. A process for the manufacture of modified N,N'-substituted 2,4,5-triketoimidazolidines which comprises reacting
(a) at least one oxamidic ester of Formula (VII)

$$R—(NH—CO—CO—OR')_r$$

(VII)

wherein R is a mono- or polynuclear, mono to hexavalent carbocyclic or heterocyclic aromatic including quinone group and having up to 20 carbon atoms being unsubstituted or substituted by at least one substituent having up to 18 carbon atoms selected from the group consisting of halogen, nitro, dialkylamino, diarylamino, alkylarylamino and halogenated or unhalogenated alkyl, alkoxy, carboxyalkyl, carboxyaryl and acyl groups,
r is an integer of from 1 to 6, and wherein
R' is individually selected from a group consisting of an aliphatic hydrocarbon group having up to 18 carbon atoms, a cycloaliphatic hydrocarbon group with up to 8 carbon atoms, a mononuclear aromatic hydrocarbon group being unsubstituted or substituted by at least one hydrocarbon group and having a total of up to 14 carbon atoms,
(b) at least one organic isocyanate of Formula (VIII)

$$R''' — (N=C=O)_s$$

(VIII)

wherein s is an integer from 1 to 4 and R''' is selected from the group consisting of aliphatic, cycloaliphatic, aromatic and aromatic-aliphatic group with up to 20 carbon atoms and (D) at least one compound selected from the group consisting of
(d) an azomethine of Formula (37)

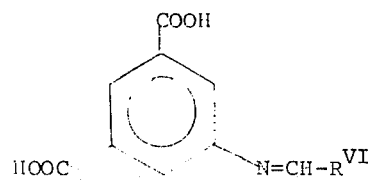

(e) a metal chelate of component (d),
(f) an azo compound of Formula (38),

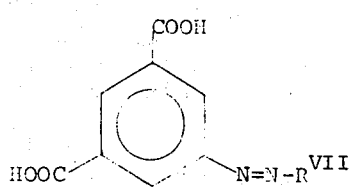

(33)

(g) a metal chelate of component (f),
wherein
R$^{17}$ is an aromatic group having at least one aromatic nucleus and having from 6 to 14 carbon atoms and containing a hydroxy group ortho to the azomethine group, a substituted product thereof having from 6 to 22 carbon atoms and having at least one substituent selected from the group consisting of alkyl, cycloalkyl, benzyl, hydroxy, methoxy, aryl, aryloxy, carboxyl, acyl, nitro, and halogen, each substituent containing up to 6 carbon atoms,
R$^{VII}$ is an aromatic group having 6 to 14 carbon atoms and containing a hydroxy group ortho to the azo group, a substituted product thereof having up to 22 carbon atoms and having at least one substituent selected from the group consisting of alkyl, cyclohexyl, alkoxy, acyl, carboxyalkyl, a fluorocarbon group or halogen, each substituent containing up to 6 carbon atoms so as to obtain a reaction product of N,N'-substituted 2,4,5-triketoimidazolidine which is subsequently separated or reacted with (h) a chelate forming metal compound
whereby a modified N,N'-substituted 2,4,5-triketoimidazolidine is produced.

16. A process as claimed in claim 15 wherein there is employed as an additional reaction component (c) a polycarboxylic acid having 4 to 70 carbon atoms of Formula (44)

(44)

wherein
R$_{poly}$ is a di- to hexavalent, at least mononuclear radical selected from the group consisting of aliphatic, carbocyclic, aliphatic-aromatic hydrocarbon radicals, heterocyclic radicals, each having up to 20 carbon atoms, substitution products thereof being substituted by at least one of the radicals alkyl, halogen and amino and in which
$p$ is an integer of from 2 to 6,
wherein component (c) is present in an amount of 5 to 95 mole percent referred to one of the other reactants (a) and (b) wherein the total of the polycarboxylic acid and of the other reactant is 100 mol percent.

17. A process as claimed in claim 8 wherein the metal chelate forming metal compound (h) is a compound selected from the group consisting of an oxide, hydroxide, carbonate, halide, alcoholate and phenolate and wherein said metal compound (h) is reacted in the presence of a tertiary amine, a phosphine selected from the group consisting of triphenyl-phosphine and trimorpholinophosphine and a mixture thereof and wherein trimellitic anhydride is reacted as a polycarboxylic acid (c) and 4,4'-diisocyanatodiphenyl methane or 4,4'-diisocyanatodiphenyl ether is reacted as an isocyanate (b) and 4,4'-bis-(ethoxalylamino)-diphenylmethane or 4,4'-bis-(ethoxalkylamino)-diphenyl ether is reacted as an oxamidic acid ester (a).

* * * * *

UNITED STATES PATENT AND TRADEMARK OFFICE
CERTIFICATE OF CORRECTION

PATENT NO. : 3,887,507
DATED : June 3, 1975
INVENTOR(S) : Johannes Reese and Kurt Kraft It is certified that error appears in the above-identified patent and that said Letters Patent are hereby corrected as shown below:

1. Under [30] additionally insert:

June 19, 1970    Germany    2030.233

2. In the Abstract, line 11, "ioscyanate" should be "isocyanate"

3. Col. 1, line 14, "imidazoline" should be "imidazolidine"

4. Col. 1, line 46, "conndensation" should be "condensation"

5. Col. 2, line 19, "azometh ineor" should be "azomethine or"

6. Col. 3, line 3, "stabiity" should be "stability"

7. Col. 4, line 38, "polycarboxyic" should be "polycarboxylic"

8. Col. 5, line 60, "pentaor" should be "penta or"

9. Col. 8, line 44, "meleic" should be "maleic"

10. Col. 9, line 41, delete "and" and substitute "the"

11. Col. 10, line 5, "salicyclaldehyde" should be "salicylaldehyde"

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

12. Col. 10, line 46, "buranedioldie-" should be "butanedioldie-"

13. Col. 11, line 1, in the formula, delete "a.A' + C.C' = b.B' " and insert --a.A' + c.C' = b.B'

14. Col. 12, line 41, "mone" should be "mono"

15. Col. 13, line 25, "shown" should be "show"

16. Col. 16, line 41, "XXVIII" should be "XXXVII"

17. Claim 1, column 34, line 55, "triketoimidazalidine" should be "triketoimidazolidine"

18. Claim 7, column 35, line 31, "celate" should be "chelate"

19. Claim 8, column 36, line 16, "axome-" should be "azome-"

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

20. Col. 15, line 52 change "gram" to "grams"

21. Col. 16, line 12, change "g" to "grams"

22. Claim 15, column 38, line 31, change "mono- or" to "mono- to"

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above–identified patent and that said Letters Patent are hereby corrected as shown below:

Column 5 between lines 41-45 intensify the printing so that the formula is as indicated here:

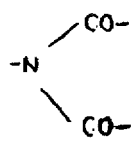

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

In columns 11 and 12 between lines 43-48 intensify the printing so that the formulae are as indicated here:

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

in column 33 between lines 59-65 intensify the printing so that the formula is as indicated here:

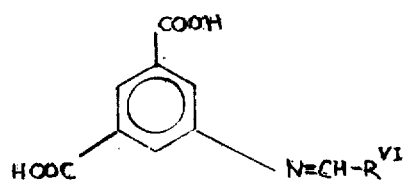

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

in column 34 between lines 27-34 intensify the printing so that the formula is as indicated here:

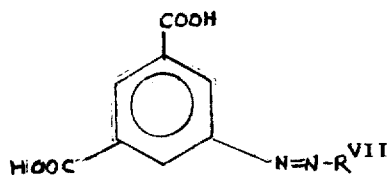

(38)

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above—identified patent and that said Letters Patent are hereby corrected as shown below:

In column 35 between lines 64-70 intensify the printing so that the formula is as indicated here:

(37)
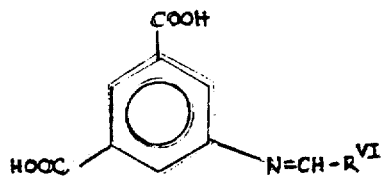

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

in column 36 between lines 4-11 intensify the printing so that the formula is as indicated here:

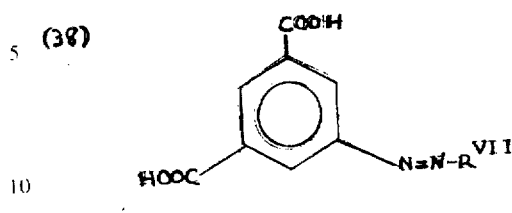

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

in column 37 between lines 7-15 and lines 19-26 intensify the printing so that the formulae are as indicated here:

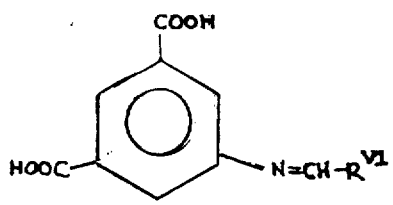

(e) a metal chelate of component (d),
(f) an azo compound of Formula (38).

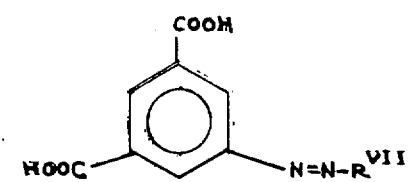

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

Please make the following corrections to the formulas beginning between columns 17 and 18.

The last formula (5) at the bottom of columns 17 and 18 and the formulas on columns 19 and 20 through formula (8) were incorrectly placed. They are shown properly inserted following formula (XXII) and before (XXIV) in columns 25 and 26. The formulas are shown in their entirety and in correct order.

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

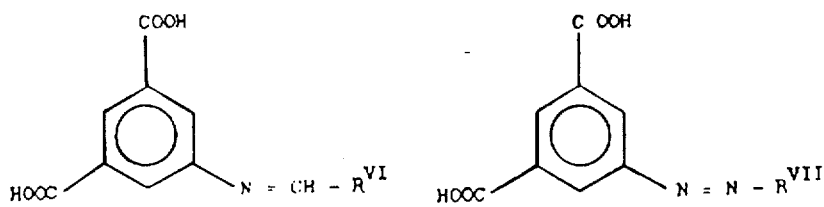

(37)  (38)

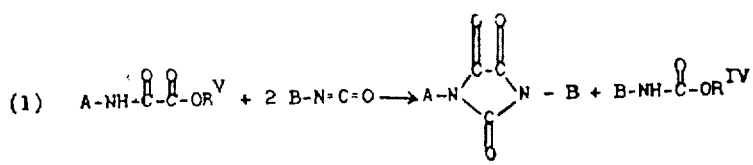

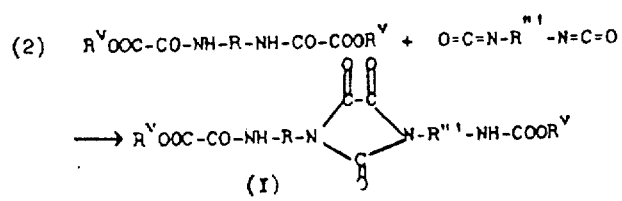

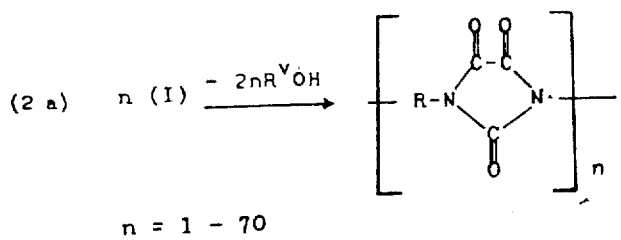

n = 1 - 70

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

(3) 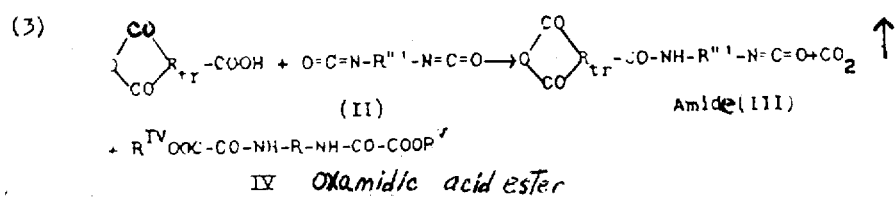

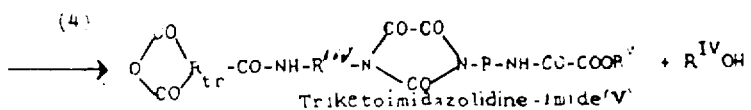
IV Oxamidic acid ester (4)

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

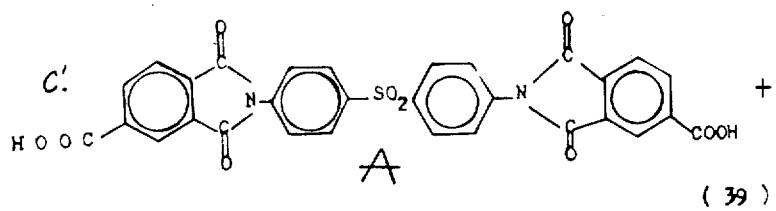

(39)

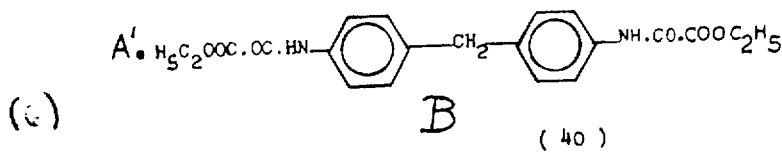

(40)

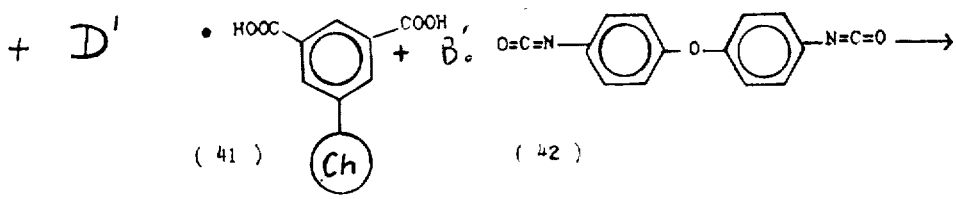

(41)   (42)

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

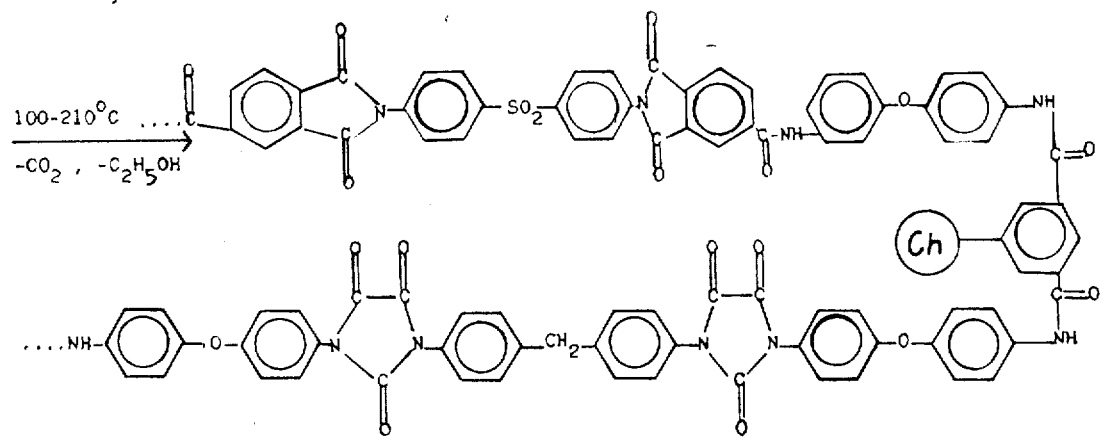

(43)

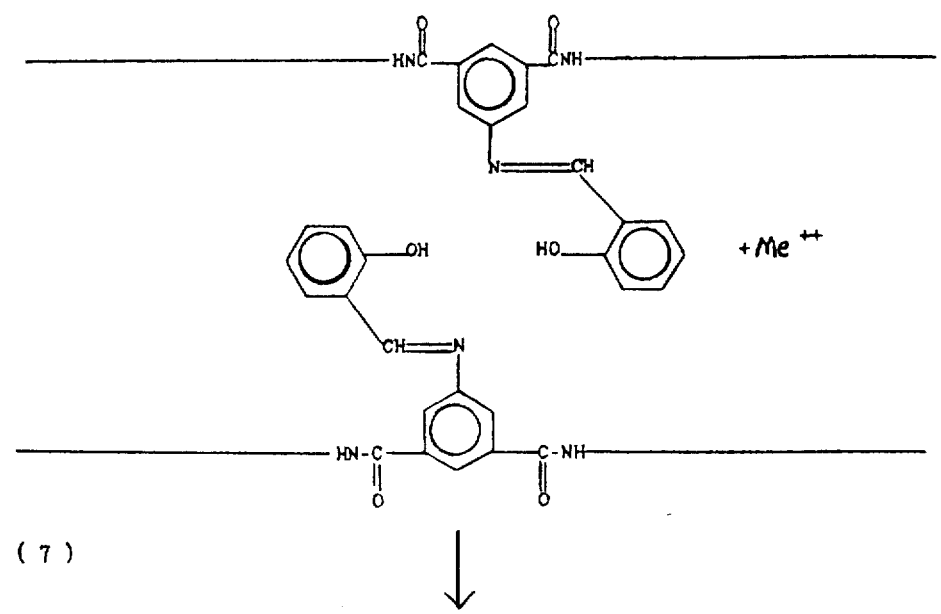

(7)

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

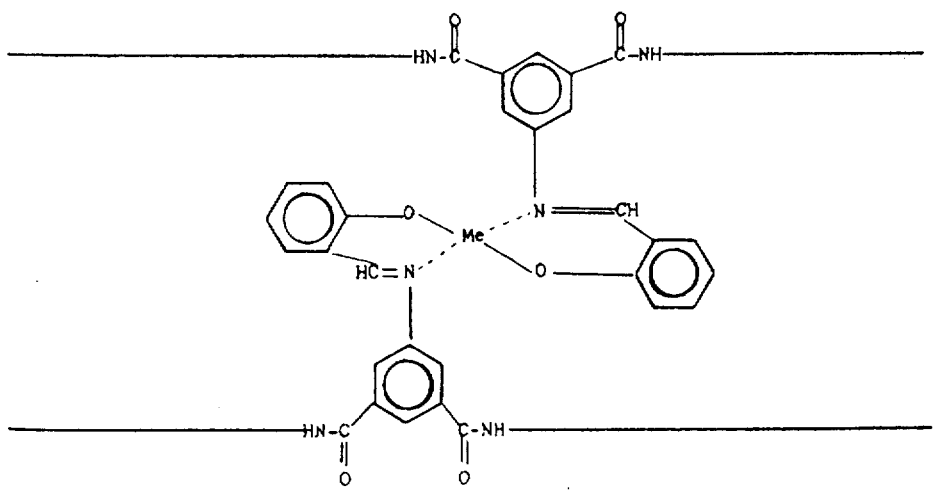

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

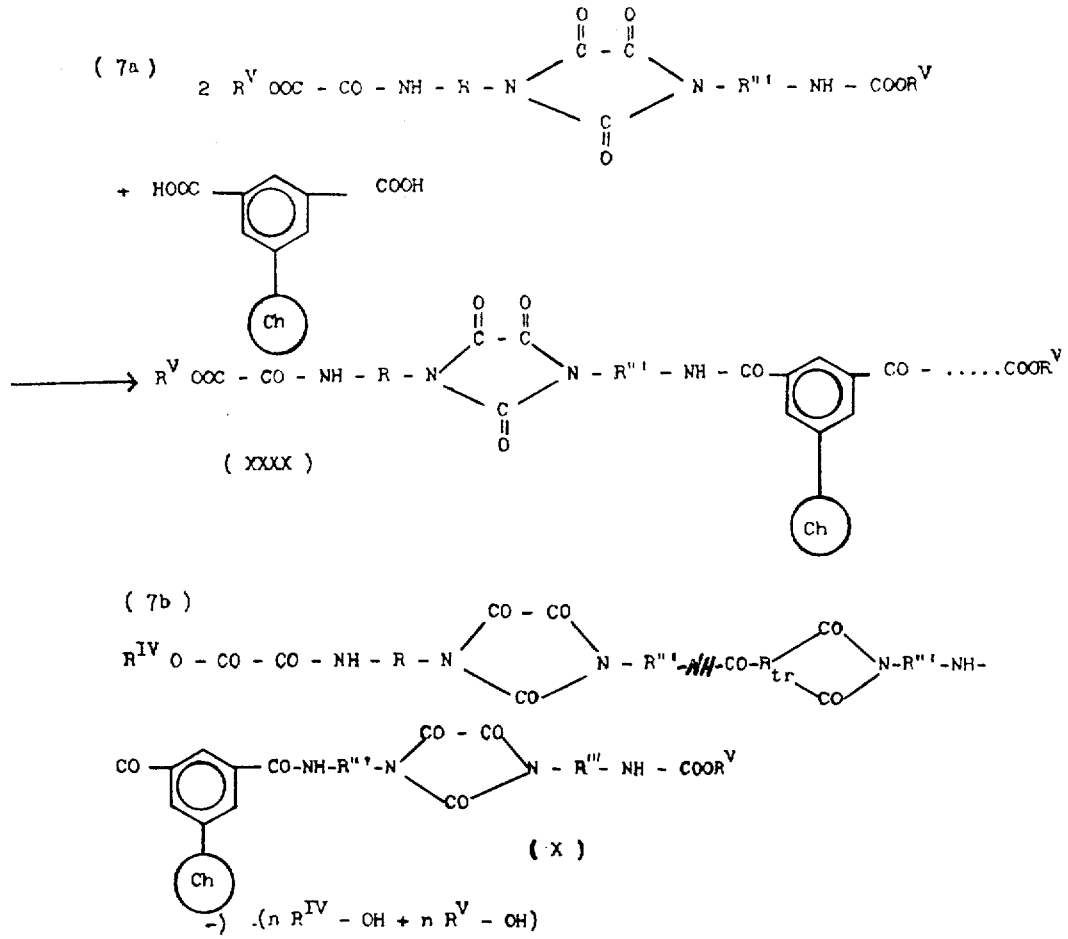

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

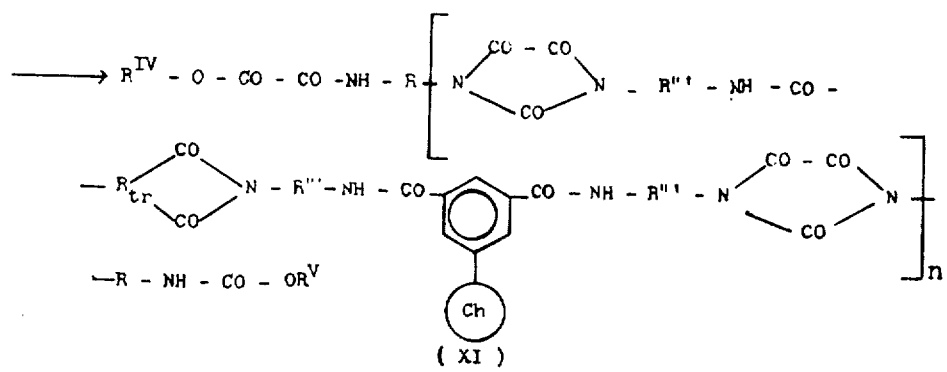

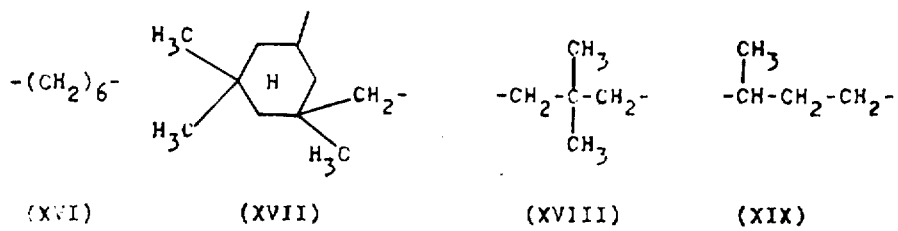

(XVI)　　(XVII)　　(XVIII)　　(XIX)

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

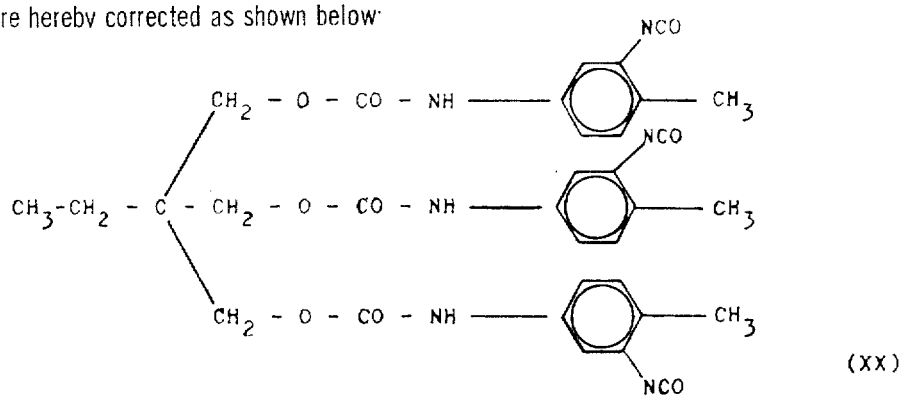

(XX)

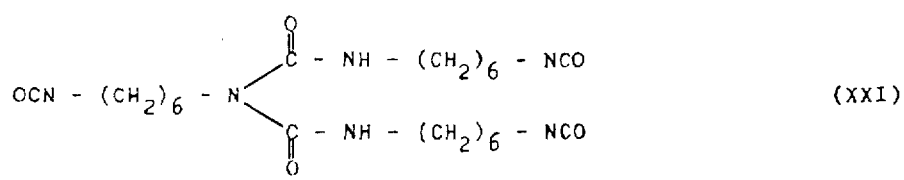

(XXI)

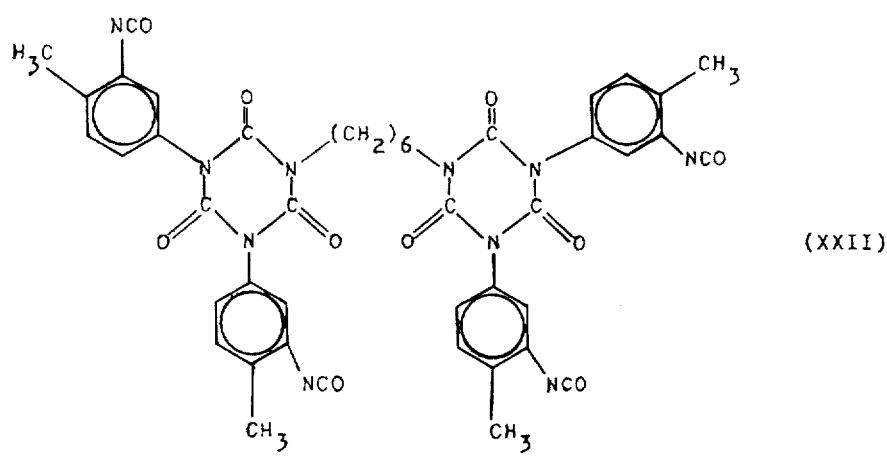

(XXII)

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

(5) 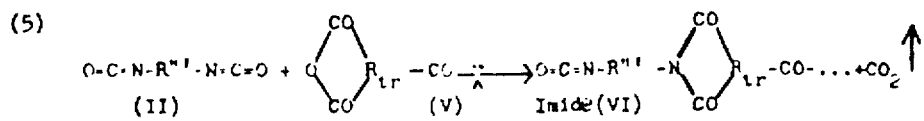

 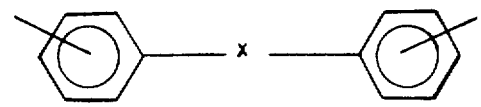 

(47)  (48)  (49)

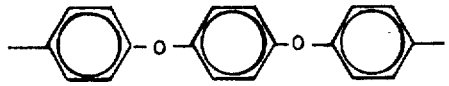

(XV)

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

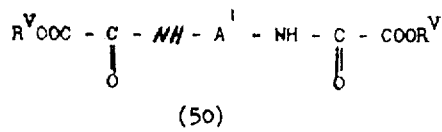

(50)

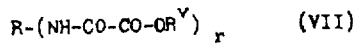 (VII)

 (44)

 (VIII)

 (IX)

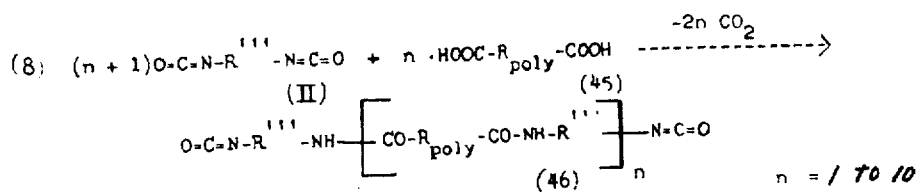

n = 1 to 10

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

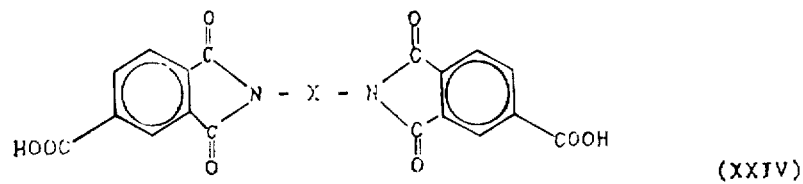

(XXIV)

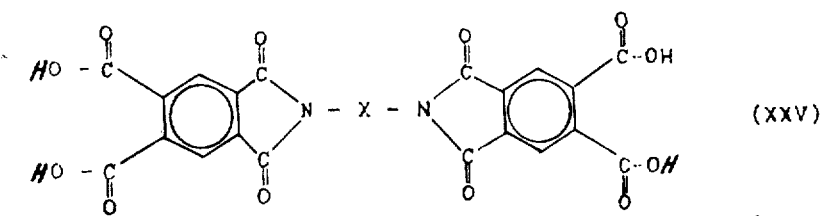

(XXV)

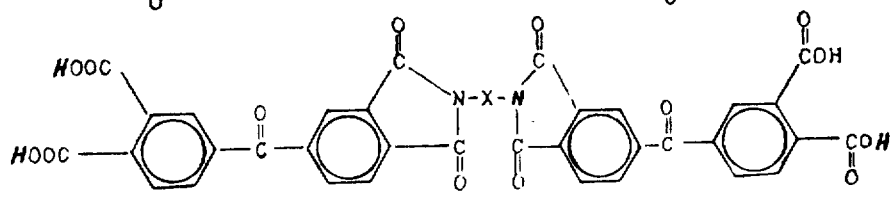

(XXVI)

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

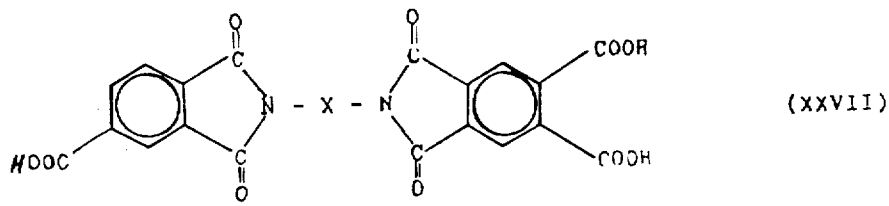

(XXVII)

$X = (CH_2)_m \qquad m = 2 - 8$

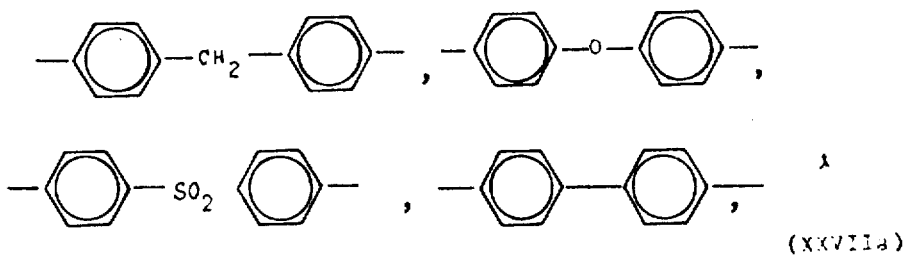

(XXVIIa)

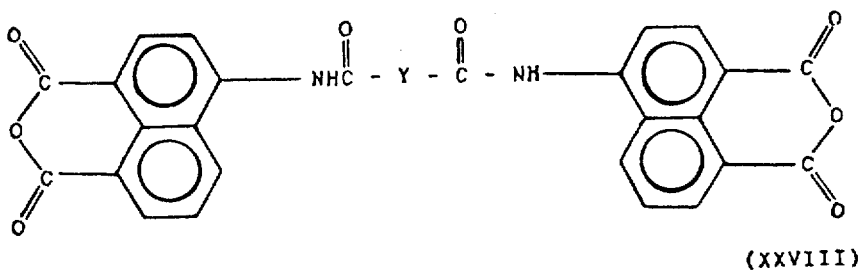

(XXVIII)

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

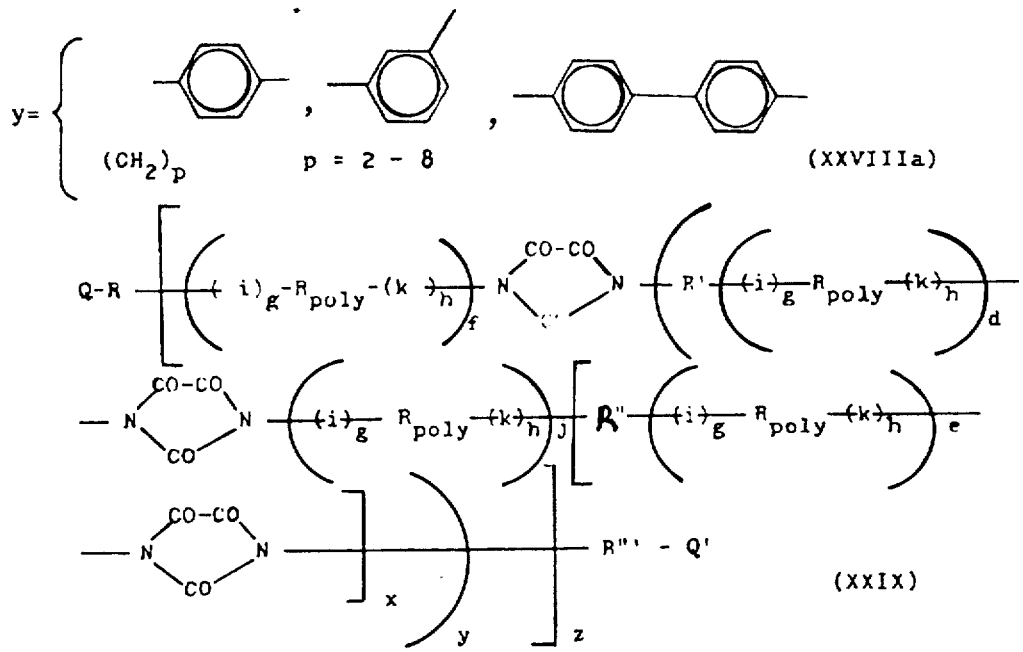

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

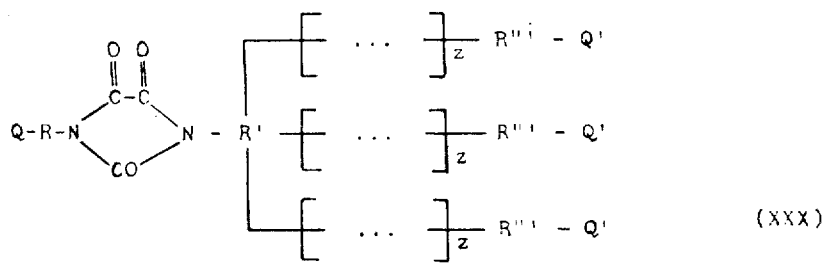

(XXX)

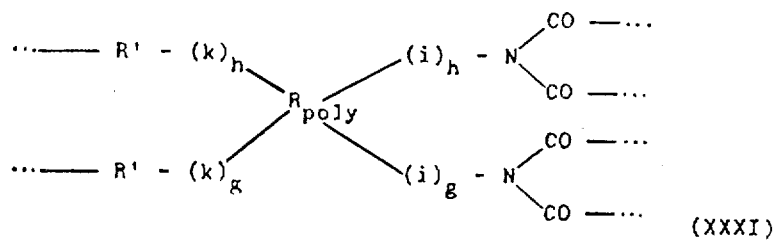

(XXXI)

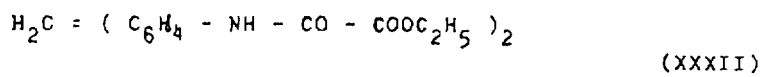

(XXXII)

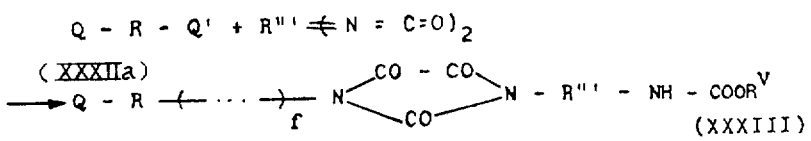

(XXXIII)

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

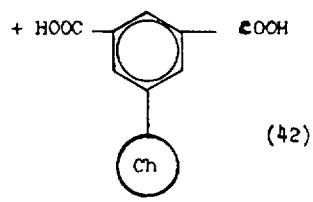

(42)

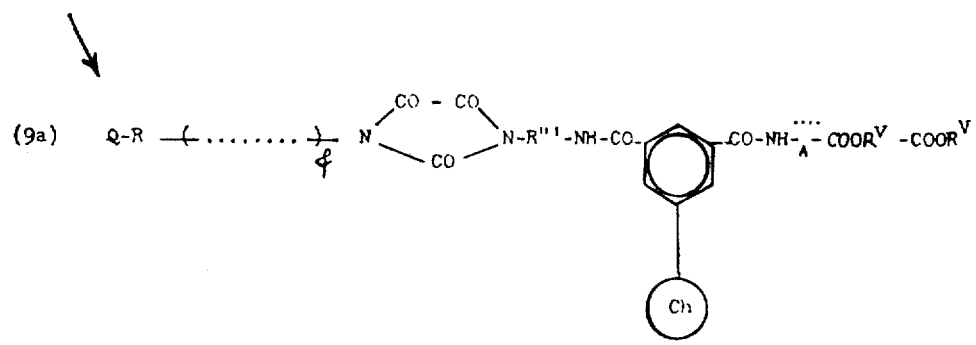

(9a)

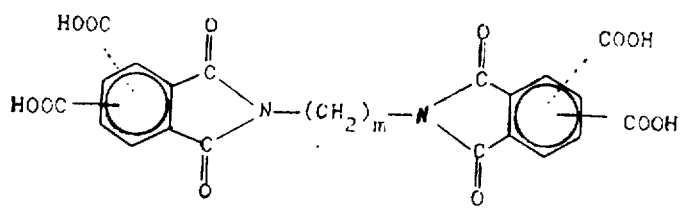

XXXIV m = 2-8

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

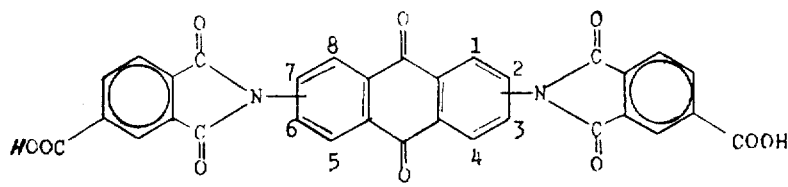

XXXV

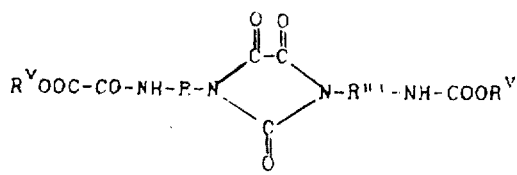

(ic)   + Compound XXIV   or (37) or (38)

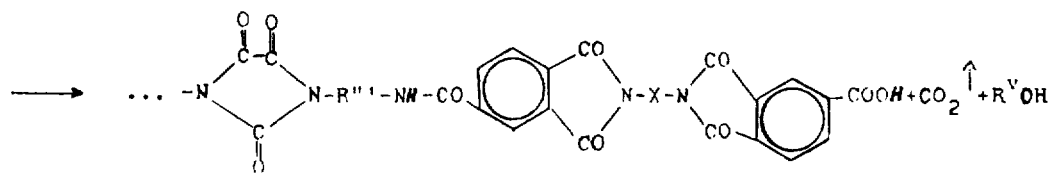

or   XXXVI

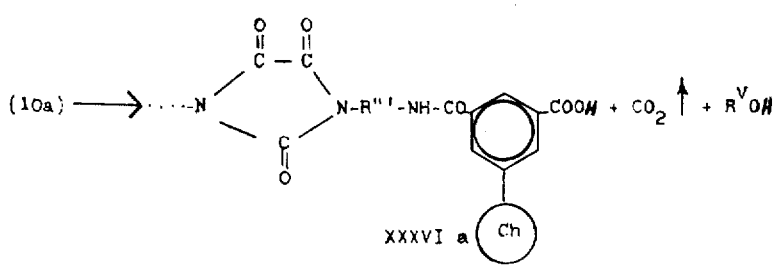

XXXVI a

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

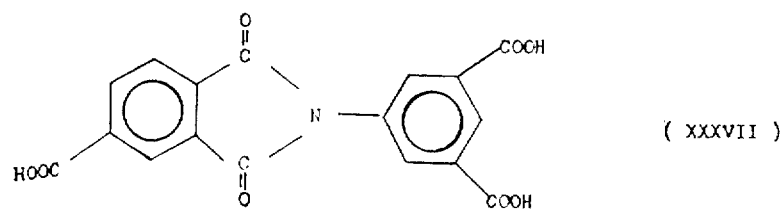

( XXXVII )

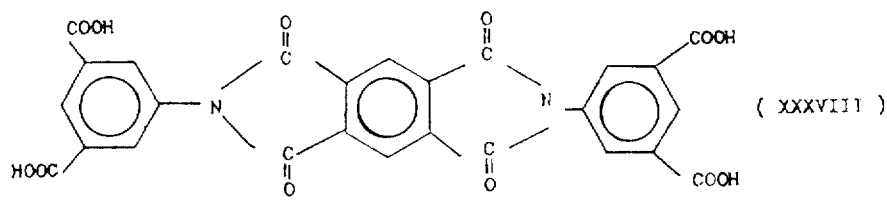

( XXXVIII )

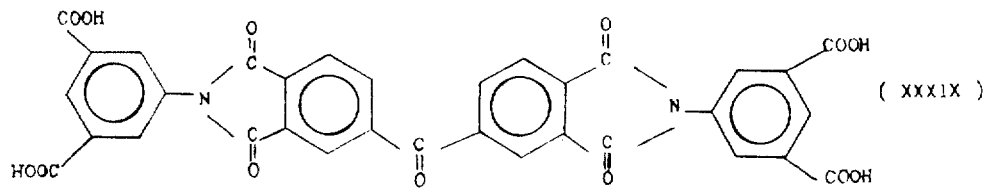

( XXXIX )

UNITED STATES PATENT AND TRADEMARK OFFICE
CERTIFICATE OF CORRECTION

PATENT NO. : 3,887,507
DATED : June 3, 1975
INVENTOR(S) : Johannes Reese et al

It is certified that error appears in the above-identified patent and that said Letters Patent are hereby corrected as shown below:

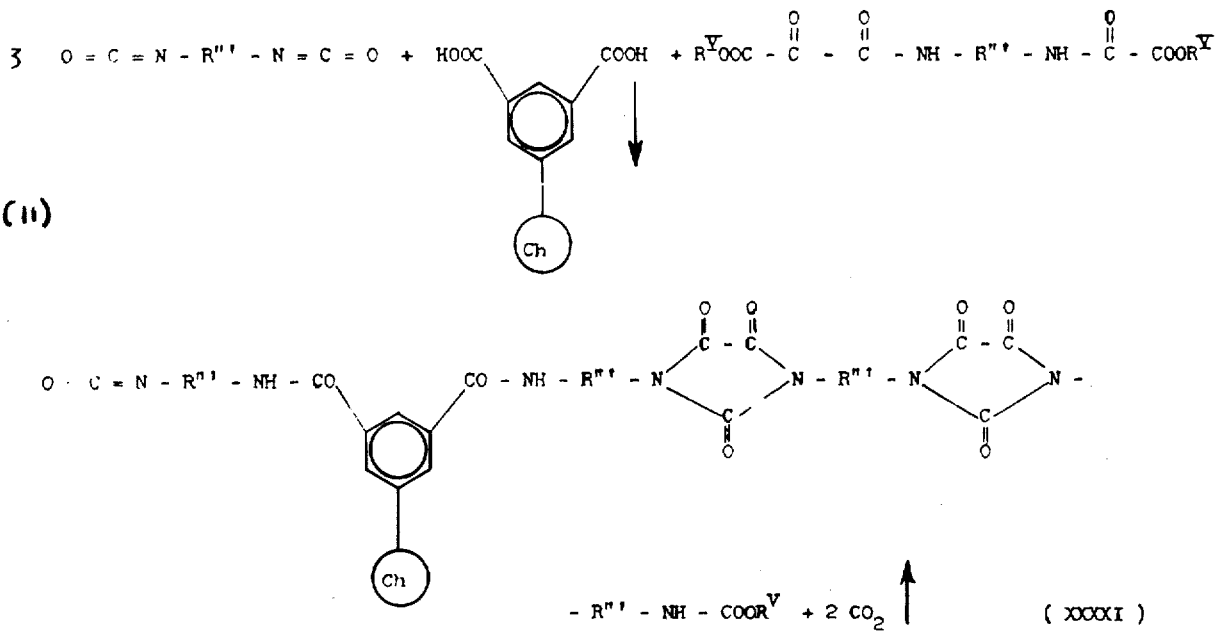

Signed and Sealed this

Third Day of August 1976

[SEAL]

Attest:

RUTH C. MASON
*Attesting Officer*

C. MARSHALL DANN
*Commissioner of Patents and Trademarks*